(12) United States Patent
Tanaka et al.

(10) Patent No.: US 9,030,755 B2
(45) Date of Patent: May 12, 2015

(54) ZOOM LENS SYSTEM, OPTICAL APPARATUS, AND METHOD FOR MANUFACTURING ZOOM LENS SYSTEM

(75) Inventors: Issei Tanaka, Yokohama (JP); Norikazu Yokoi, Yokohama (JP); Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 367 days.

(21) Appl. No.: 13/358,042

(22) Filed: Jan. 25, 2012

(65) Prior Publication Data

US 2012/0188647 A1 Jul. 26, 2012

(30) Foreign Application Priority Data

Jan. 25, 2011 (JP) ................................. 2011-013246
Jun. 30, 2011 (JP) ................................. 2011-145908

(51) Int. Cl.
*G02B 15/14* (2006.01)
*G02B 15/173* (2006.01)

(52) U.S. Cl.
CPC .............. *G02B 15/173* (2013.01); *G02B 1/115* (2013.01)

(58) Field of Classification Search
USPC .......................... 359/766, 695, 714, 676, 682
See application file for complete search history.

(56) References Cited

U.S. PATENT DOCUMENTS

| | | | |
|---|---|---|---|
| 6,025,962 A * | 2/2000 | Suzuki ........................... | 359/766 |
| 6,483,648 B1 | 11/2002 | Yamanashi | |
| 7,184,221 B2 | 2/2007 | Misaka | |
| 7,196,851 B2 | 3/2007 | Misaka | |
| 7,280,286 B2 | 10/2007 | Hayakawa | |
| 7,532,412 B2 | 5/2009 | Hatada | |
| 7,746,563 B2 | 6/2010 | Muramatsu et al. | |
| 7,961,402 B2 | 6/2011 | Saori | |
| 2004/0125462 A1 | 7/2004 | Misaka | |
| 2007/0024985 A1 | 2/2007 | Misaka | |
| 2007/0070521 A1 | 3/2007 | Hayakawa | |
| 2007/0229968 A1 * | 10/2007 | Satori et al. ................... | 359/676 |
| 2007/0297067 A1 | 12/2007 | Muramatsu et al. | |
| 2008/0212206 A1 | 9/2008 | Hatada | |
| 2009/0168184 A1 * | 7/2009 | Yamada et al. ............... | 359/601 |
| 2010/0195215 A1 | 8/2010 | Saori | |
| 2010/0302648 A1 | 12/2010 | Hatada | |
| 2011/0176224 A1 * | 7/2011 | Sato et al. ..................... | 359/683 |

FOREIGN PATENT DOCUMENTS

| | | |
|---|---|---|
| JP | 10-090601 A | 4/1998 |
| JP | 10-111456 A | 4/1998 |
| JP | 2000-356704 A | 12/2000 |
| JP | 2001-228397 A | 8/2001 |

(Continued)

*Primary Examiner* — Alicia M Harrington
(74) *Attorney, Agent, or Firm* — Miles & Stockbridge P.C.

(57) ABSTRACT

A zoom lens optical system includes, in order from an object side along an optical axis: a first lens group having positive refractive power; a second lens group having negative refractive power; a third lens group having positive refractive power; a fourth lens group having negative refractive power; and a fifth lens group having positive refractive power, wherein upon zooming from a wide-angle end state to a telephoto end state, the first lens group being moved with respect to an image plane, a distance between the first lens group and the second lens group increasing, a distance between the second lens group and the third lens group decreasing, a distance between the third lens group and the fourth lens group varying, and a distance between the fourth lens group and the fifth lens group varying.

24 Claims, 20 Drawing Sheets

(56) References Cited

FOREIGN PATENT DOCUMENTS

| | | |
|---|---|---|
| JP | 2004-198529 A | 7/2004 |
| JP | 2007-093975 A | 4/2007 |
| JP | 2008-003195 A | 1/2008 |
| JP | 2008-003511 A | 1/2008 |
| JP | 2008-015251 A | 1/2008 |
| JP | 2008-216440 A | 9/2008 |
| JP | 2008-233585 | 10/2008 |
| JP | 2010-032702 A | 2/2010 |
| JP | 2010-198012 A | 9/2010 |
| JP | 2010-271362 A | 12/2010 |
| JP | 2010-276656 A | 12/2010 |

\* cited by examiner

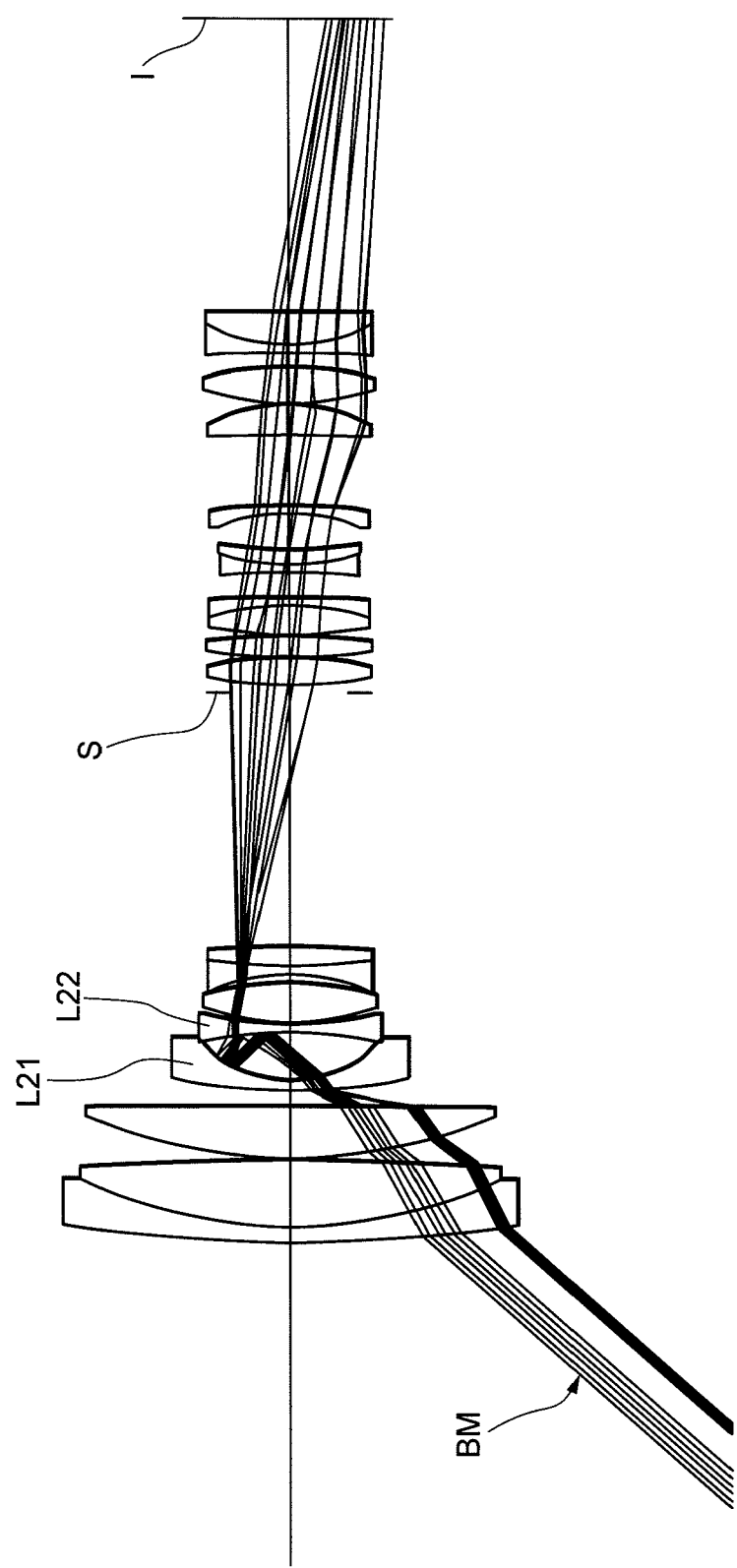

ZOOM LENS SYSTEM, OPTICAL APPARATUS, AND METHOD FOR MANUFACTURING ZOOM LENS SYSTEM

The disclosure of the following priority applications are herein incorporated by reference:
Japanese Patent Application No. 2011-013246 filed on Jan. 25, 2011; and
Japanese Patent Application No. 2011-145908 filed on Jun. 30, 2011.

BACKGROUND OF THE INVENTION

1. Field of the Invention

The present invention relates to a zoom lens system suitable for an interchangeable lens for a camera, a digital camera and a video camera, an optical apparatus equipped therewith, and a method for manufacturing the zoom lens system.

2. Related Background Art

As a zoom lens system used as an interchangeable lens for a single-lens reflex camera, there has been proposed a zoom lens system having a lens group with positive refractive power disposed to the most object side (for example, see Japanese Patent Application Laid-Open No. 2008-3195). Moreover, regarding such a zoom lens system, request for suppressing ghost images and flare, which deteriorate optical performance, as well as aberrations become increasingly strong. Accordingly, a higher optical performance is required to antireflection coatings applied to a lens surface, so that in order to meet such request, multilayer design technology and multilayer coating technology are continuously progressing (for example, see Japanese Patent Application Laid-Open No. 2000-356704).

However, when a conventional zoom lens system is to be made a higher zoom ratio, sufficiently high optical performance cannot be obtained. In addition, there is a problem that reflection light producing ghost images and flare is liable to be generated from optical surfaces in such a zoom lens system.

SUMMARY OF THE INVENTION

The present invention is made in view of the above-described problems, and has an object to provide a zoom lens system having excellent optical performance with further suppressing ghost images and flare, an optical apparatus equipped with the zoom lens system, and a method for manufacturing the zoom lens system.

According to a first aspect of the present invention, there is provided a zoom lens system comprising, in order from an object side along an optical axis: a first lens group having positive refractive power; a second lens group having negative refractive power; a third lens group having positive refractive power; a fourth lens group having negative refractive power; and a fifth lens group having positive refractive power, upon zooming from a wide-angle end state to a telephoto end state, the first lens group moving with respect to an image plane, a distance between the first lens group and the second lens group increasing, a distance between the second lens group and the third lens group decreasing, a distance between the third lens group and the fourth lens group varying, and a distance between the fourth lens group and the fifth lens group varying, and the following conditional expression (1) being satisfied:

$$6.500 < f1/(-f2) < 10.000 \quad (1)$$

where f1 denotes a focal length of the first lens group, and f2 denotes a focal length of the second lens group.

In the first aspect of the present invention, it is preferable that at least one optical surface among optical surfaces in the first lens group and the second lens group is applied with an antireflection coating, and the antireflection coating includes at least one layer that is formed by a wet process.

According to a second aspect of the present invention, there is provided an optical apparatus equipped with the zoom lens system according to the first aspect.

According to a third aspect of the present invention, there is provided a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising steps of: disposing the first lens group, the second lens group, the third lens group, the fourth lens group and the fifth lens group such that upon zooming from a wide-angle end state to a telephoto end state, the first lens group is moved with respect to the image plane, a distance between the first lens group and the second lens group increases, a distance between the second lens group and the third lens group decreases, a distance between the third lens group and the fourth lens group varies, and a distance between the fourth lens group and the fifth lens group varies; and satisfying the following conditional expression (1):

$$6.500 < f1/(-f2) < 10.000 \quad (1)$$

where f1 denotes a focal length of the first lens group, and f2 denotes a focal length of the second lens group.

The present invention makes it possible to provide a zoom lens system having excellently high optical performance with further suppressing ghost images and flare, an optical apparatus equipped with the zoom lens system, and a method for manufacturing the zoom lens system.

BRIEF DESCRIPTION OF THE DRAWINGS

FIGS. 2A, 2B and 2C are graphs showing various aberrations of the zoom lens system according to Example 1 upon focusing on an infinitely distant object, in which FIG. 2A shows in a wide-angle end state, FIG. 2B shows in an intermediate focal length state, and FIG. 2C shows in a telephoto end state.

FIG. 3 is a sectional view showing the lens configuration of the zoom lens system seen from another point of view according to Example 1 of the present invention, and is an explanatory view, in which light rays reflected from a first-ghost-generating surface are reflected by a second-ghost-generating surface.

FIGS. 5A, 5B and 5C are graphs showing various aberrations of the zoom lens system according to Example 2 upon focusing on an infinitely distant object, in which FIG. 5A shows in a wide-angle end state, FIG. 5B shows in an intermediate focal length state, and FIG. 5C shows in a telephoto end state.

FIGS. 7A, 7B and 7C are graphs showing various aberrations of the zoom lens system according to Example 3 upon focusing on an infinitely distant object, in which FIG. 7A shows in a wide-angle end state, FIG. 7B shows in an intermediate focal length state, and FIG. 7C shows in a telephoto end state.

FIGS. 9A, 9B and 9C are graphs showing various aberrations of the zoom lens system according to Example 4 upon focusing on an infinitely distant object, in which FIG. 9A shows in a wide-angle end state, FIG. 9B shows in an intermediate focal length state, and FIG. 9C shows in a telephoto end state.

FIGS. 11A, 11B and 11C are graphs showing various aberrations of the zoom lens system according to Example 5 upon focusing on an infinitely distant object, in which FIG. 11A shows in a wide-angle end state, FIG. 11B shows in an intermediate focal length state, and FIG. 11C shows in a telephoto end state.

DESCRIPTION OF THE MOST PREFERRED EMBODIMENT

Figure 1:
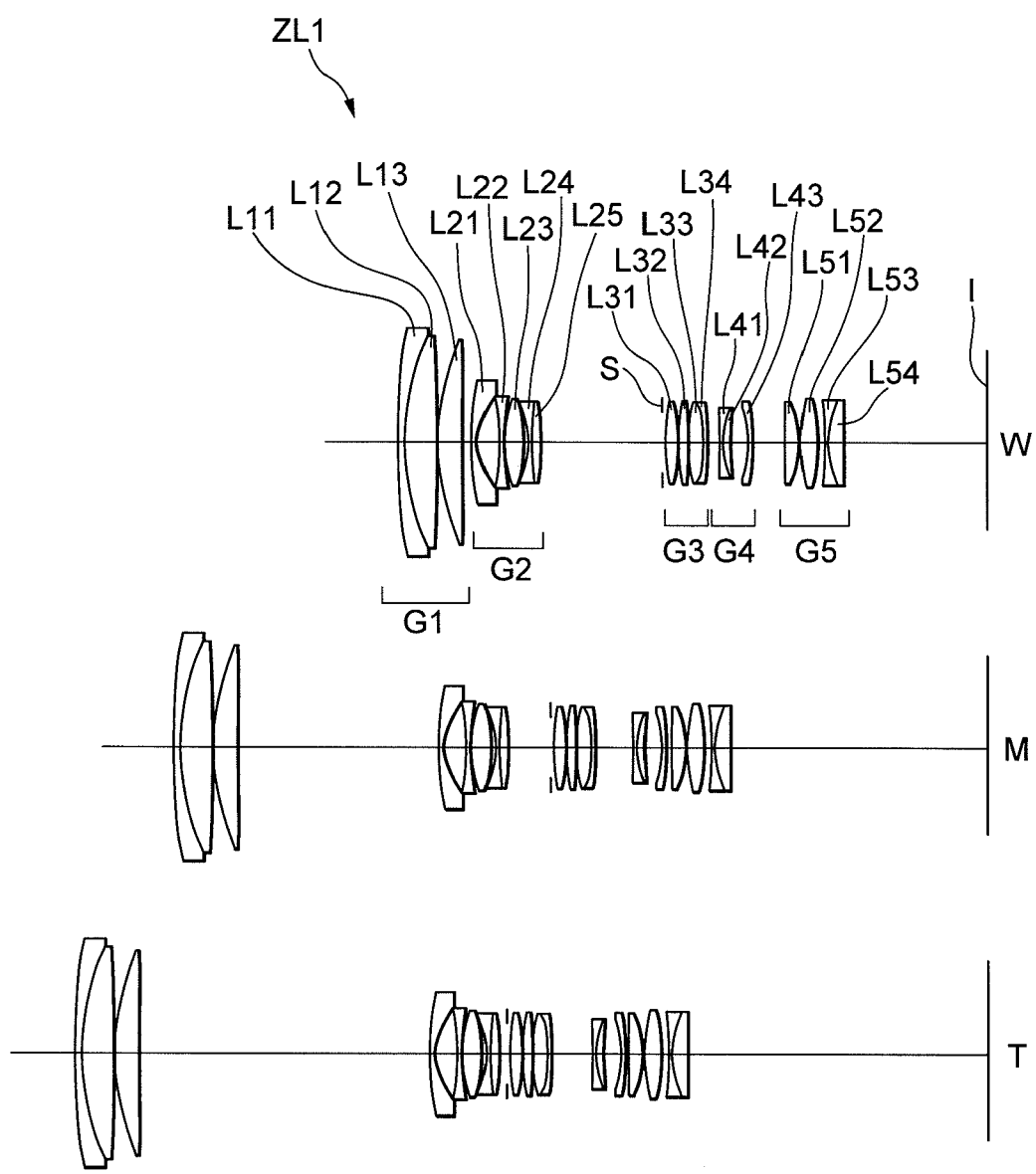
FIG. 1 is a sectional view showing a lens configuration of a zoom lens system according to Example 1 of the present invention.

A zoom lens system, and an optical apparatus equipped therewith according to the present invention are explained below.

At first, a zoom lens system according to the present invention is explained. The zoom lens system according to the present invention includes, in order from an object side along an optical axis, a first lens group having positive refractive power, a second lens group having negative refractive power, a third lens group having positive refractive power, a fourth lens group having negative refractive power, and a fifth lens group having positive refractive power. Upon zooming from a wide-angle end state to a telephoto end state, a distance between the first lens group and the second lens group increases, and a distance between the second lens group and the third lens group decreases, thereby accomplishing the zoom lens system capable of suppressing variation in distortion. Moreover, upon zooming from a wide-angle end state to a telephoto end state, a distance between the third lens group and the fourth lens group varies, and a distance between the fourth lens group and the fifth lens group varies, thereby securing a high zoom ratio. Furthermore, with suppressing variation in distortion, high optical performance can be accomplished.

The first lens group is preferably moved with respect to an image plane upon zooming from the wide-angle end state to the telephoto end state. With this configuration, it becomes possible to accomplish high optical performance with suppressing variation in astigmatism upon zooming.

Moreover, the following conditional expression (1) is satisfied:

$$6.500 < f1/(-f2) < 10.000 \quad (1)$$

where f1 denotes a focal length of the first lens group, and f2 denotes a focal length of the second lens group.

Conditional expression (1) defines an appropriate range of the focal length of the first lens group with respect to the focal length of the second lens group, and is for accomplishing high optical performance over entire variation range with suppressing variation in aberrations upon zooming from the wide-angle end state to the telephoto end state with securing a sufficient zoom ratio.

When the value for conditional expression (1) is equal to or falls below the lower limit, refractive power of the first lens group becomes excessively strong, so that it becomes difficult to suppress variation in astigmatism upon zooming. As a result, high optical performance cannot be accomplished, so that it is undesirable. In order to secure the effect of the present invention, it is preferable to set the lower limit of conditional expression (1) to 7.000. In order to further secure the effect of the present invention, it is most preferable to set the lower limit of conditional expression (1) to 7.300.

On the other hand, when the value for conditional expression (1) is equal to or exceeds the upper limit, refractive power of the second lens group becomes relatively strong, so that it becomes difficult to correct variation in off-axis aberrations, in particular, distortion and astigmatism upon zooming. As a result, high optical performance cannot be accomplished, so that it is undesirable. In order to secure the effect of the present invention, it is preferable to set the upper limit of conditional expression (1) to 9.000. In order to further secure the effect of the present invention, it is most preferable to set the upper limit of conditional expression (1) to 8.400.

Moreover, in a zoom lens system according to the present invention, the following conditional expression (2) is preferably satisfied:

$$0.500 < f3/(-f4) < 1.300 \quad (2)$$

where f3 denotes a focal length of the third lens group, and f4 denotes a focal length of the fourth lens group.

Conditional expression (2) defines an appropriate range of the focal length of the third lens group and the focal length of the fourth lens group, and is for accomplishing high optical performance over entire zoom range.

When the value for conditional expression (2) is equal to or falls below the lower limit, refractive power of the third lens group becomes excessively large with respect to refractive power of the fourth lens group, so that it becomes difficult to correct negative spherical aberration generated in the third lens group in the wide-angle end state. As a result, high optical performance cannot be accomplished, so that it is undesirable. In order to secure the effect of the present invention, it is preferable to set the lower limit of conditional expression (2) to 0.600.

On the other hand, when the value for conditional expression (2) is equal to or exceeds the upper limit, refractive power of the fourth lens group becomes relatively large with respect to refractive power of the third lens group, so that it becomes difficult to correct positive spherical aberration generated in the fourth lens group in the telephoto end state. As a result, high optical performance cannot be accomplished, so that it is undesirable. In order to secure the effect of the present invention, it is preferable to set the upper limit of conditional expression (2) to 1.200.

Moreover, in a zoom lens system according to the present invention, the following conditional expression (3) is preferably satisfied:

$$3.900 < f1/fw < 11.000 \quad (3)$$

where f1 denotes the focal length of the first lens group, and fw denotes a focal length of the zoom lens system in the wide-angle end state.

Conditional expression (3) defines an appropriate range of the focal length of the first lens group, and is for accomplishing high optical performance with suppressing variation in off-axis aberrations generated upon zooming from the wide-angle end state to the telephoto end state.

When the value for conditional expression (3) is equal to or falls below the lower limit, refractive power of the first lens group becomes excessively strong, so that it becomes difficult to suppress variation in off-axis aberrations, in particular, astigmatism upon zooming. As a result, high optical performance cannot be accomplished, so that it is undesirable. In order to secure the effect of the present invention, it is preferable to set the lower limit of conditional expression (3) to 4.600. In order to further secure the effect of the present invention, it is most preferable to set the lower limit of conditional expression (3) to 5.200.

On the other hand, when the value for conditional expression (3) is equal to or exceeds the upper limit, refractive power of the first lens group becomes excessively weak, so that in order to obtain a given zoom ratio a moving amount of the first lens group with respect to the image plane has to be increased. Then, variation in a height from the optical axis of off-axis ray upon zooming from the wide-angle end state to the telephoto end state becomes large, so that it becomes difficult to suppress variation in off-axis aberrations, in particular, astigmatism. As a result, high optical performance cannot be accomplished, so that it is undesirable. In order to secure the effect of the present invention, it is preferable to set the upper limit of conditional expression (3) to 9.000. In order to further secure the effect of the present invention, it is most preferable to set the upper limit of conditional expression (3) to 7.000.

Moreover, in a zoom lens system according to the present invention, the following conditional expression (4) is preferably satisfied:

$$0.280 < f1/ft < 0.520 \quad (4)$$

where f1 denotes the focal length of the first lens group, and ft denotes a focal length of the zoom lens system in the telephoto end state.

Conditional expression (4) defines an appropriate range of the focal length of the first lens group, and is for accomplishing high optical performance with suppressing variation in aberrations generated upon zooming from the wide-angle end state to the telephoto end state.

When the value for conditional expression (4) is equal to or falls below the lower limit, refractive power of the first lens group becomes excessively strong, so that it becomes difficult to suppress variation in spherical aberration upon zooming. As a result, high optical performance cannot be accomplished, so that it is undesirable. In order to secure the effect of the present invention, it is preferable to set the lower limit of conditional expression (4) to 0.310.

On the other hand, when the value for conditional expression (4) is equal to or exceeds the upper limit, refractive power of the first lens group becomes excessively weak, so that in order to obtain a given zoom ratio a moving amount of the first lens group with respect to the image plane has to be increased. Then, variation in a height from the optical axis of off-axis ray upon zooming from the wide-angle end state to the telephoto end state becomes large, so that it becomes difficult to suppress variation in off-axis aberrations, in particular, astigmatism. As a result, high optical performance cannot be accomplished, so that it is undesirable. In order to secure the effect of the present invention, it is preferable to set the upper limit of conditional expression (4) to 0.480. In order to further secure the effect of the present invention, it is most preferable to set the upper limit of conditional expression (4) to 0.440.

Moreover, in a zoom lens system according to the present invention, the following conditional expression (5) is preferably satisfied:

$$0.0300 < (-f2)/ft < 0.0700 \quad (5)$$

where f2 denotes the focal length of the second lens group, and ft denotes a focal length of the zoom lens system in the telephoto end state.

Conditional expression (5) is for accomplishing high optical performance with suppressing variation in aberrations generated in the second lens group with correcting variation in aberrations generated in the first lens group upon zooming from the wide-angle end state to the telephoto end state.

When the value for conditional expression (5) is equal to or falls below the lower limit, refractive power of the second lens group becomes excessively strong, so that it becomes difficult to suppress variations in spherical aberration and astigmatism upon zooming from the wide-angle end state to the telephoto end state. As a result, high optical performance cannot be accomplished, so that it is undesirable. In order to secure the effect of the present invention, it is preferable to set the lower limit of conditional expression (5) to 0.0360. In order to further secure the effect of the present invention, it is most preferable to set the lower limit of conditional expression (5) to 0.0410.

On the other hand, when the value for conditional expression (5) is equal to or exceeds the upper limit, refractive power of the second lens group becomes excessively weak, so that a moving amount of the second lens group increases. Then, it becomes difficult to suppress variations in spherical aberration and astigmatism generated in the first lens group upon zooming from the wide-angle end state to the telephoto end state. As a result, high optical performance cannot be accomplished, so that it is undesirable. In order to secure the effect of the present invention, it is preferable to set the upper limit of conditional expression (5) to 0.0630. In order to further secure the effect of the present invention, it is most preferable to set the upper limit of conditional expression (5) to 0.0570.

Moreover, in a zoom lens system according to the present invention, the following conditional expression (6) is preferably satisfied:

$$0.050 < f3/ft < 0.150 \quad (6)$$

where ft denotes the focal length of the zoom lens system in the telephoto end state, and f3 denotes a focal length of the third lens group.

Conditional expression (6) is for accomplishing high optical performance with suppressing variations in aberrations generated in the third lens group with correcting variations in aberrations generated in the first lens group upon zooming from the wide-angle end state to the telephoto end state.

When the value for conditional expression (6) is equal to or falls below the lower limit, refractive power of the third lens group becomes excessively strong, so that it becomes difficult to suppress variation in spherical aberration generated upon zooming from the wide-angle end state to the telephoto end state. As a result, high optical performance cannot be accomplished, so that it is undesirable. In order to secure the effect of the present invention, it is preferable to set the lower limit of conditional expression (6) to 0.065. In order to further secure the effect of the present invention, it is most preferable to set the lower limit of conditional expression (6) to 0.075.

On the other hand, when the value for conditional expression (6) is equal to or exceeds the upper limit, refractive power of the third lens group becomes excessively weak, so that it becomes difficult to suppress variation in spherical aberration generated in the first lens group upon zooming from the wide-angle end state to the telephoto end state. As a result, high optical performance cannot be accomplished, so that it is undesirable. In order to secure the effect of the present invention, it is preferable to set the upper limit of conditional expression (6) to 0.130. In order to further secure the effect of the present invention, it is most preferable to set the upper limit of conditional expression (6) to 0.110.

Moreover, in a zoom lens system according to the present invention, the first lens group preferably moves to the object side with respect to the image plane upon zooming from the wide-angle end state to the telephoto end state. With this configuration, refractive power of the first lens group can be made weak, so that it becomes possible to accomplish high optical performance with suppressing variation in astigmatism generated upon zooming from the wide-angle end state to the telephoto end state.

Moreover, in a zoom lens system according to the present invention, it is preferable that a distance between the third lens group and the fourth lens group increases, and a distance between the fourth lens group and the fifth lens group decreases upon zooming from the wide-angle end state to the telephoto end state. With this configuration, a position of a combined principal point of the third through fifth lens groups in the telephoto end state can be moved toward the object side from a position of a combined principal point of the third through fifth lens groups in the wide-angle end state, so that zooming can be effectively carried out. Accordingly, refractive power or the moving amount of each lens group can be suppressed by just that much, so that high optical performance can be accomplished.

Moreover, in a zoom lens system according to the present invention, upon zooming from the wide-angle end state to the telephoto end state the third lens group and the fifth lens group are preferably moved in a body with respect to the image plane. With this configuration, it becomes possible to construct the third lens group and the fifth lens group in a body, so that a mutual decentering amount between the third lens group and the fifth lens group generated by the manufacturing error can be suppressed, so that generation of decentering coma generated between the third lens group and the fifth lens group can be suppressed. Moreover, high optical performance can be accomplished with suppressing variation in astigmatism upon zooming.

Moreover, in a zoom lens system according to the present invention, an aperture stop is preferably disposed to the image side of the second lens group. With this configuration, high optical performance can be accomplished with suppressing variation in distortion generated upon zooming from the wide-angle end state to the telephoto end state.

Moreover, in a zoom lens system according to the present invention, an aperture stop is preferably disposed between the second lens group and the third lens group. With this configuration, high optical performance can be accomplished with suppressing variation in distortion generated upon zooming from the wide-angle end state to the telephoto end state.

Moreover, in a zoom lens system according to the present invention, upon zooming from the wide-angle end state to the telephoto end state an aperture stop is preferably moved in a body with the third lens group. With this configuration, variation in the height of the off-axis ray passing through the third lens group can be suppressed, and variations in coma, curvature of field and astigmatism can be suppressed, so that high optical performance can be accomplished.

Moreover, an optical apparatus according to the present invention is characterized by including the above-described zoom lens system. With this configuration, it becomes possible to accomplish an optical apparatus having sufficiently high optical performance.

Moreover, a method for manufacturing a zoom lens system according to the present invention is a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising steps of:

disposing the first lens group, the second lens group, the third lens group, the fourth lens group, and the fifth lens group such that upon zooming from a wide-angle end state to a telephoto end state the first lens group is moved with respect to an image plane, a distance between the first lens group and the second lens group increases, a distance between the second lens group and the third lens group decreases, a distance between the third lens group and the fourth lens group varies, and a distance between the fourth lens group and the fifth lens group varies; and satisfying the following conditional expression (1):

$$6.500 < f1/(-f2) < 10.000 \qquad (1)$$

where f1 denotes a focal length of the first lens group, and f2 denotes a focal length of the second lens group.

With this method for manufacturing a zoom lens system, it becomes possible to manufacture a zoom lens system having sufficiently high optical performance.

Then, a zoom lens system seen from another point of view according to the present invention, and an optical apparatus equipped therewith are explained.

At first, a zoom lens system seen from another point of view according to the present invention is explained. A zoom lens system seen from another point of view according to the present invention includes, in order from an object side along an optical axis, a first lens group having positive refractive power, a second lens group having negative refractive power, a third lens group having positive refractive power, a fourth lens group having negative refractive power, and a fifth lens group having positive refractive power. Upon zooming from a wide-angle end state to a telephoto end state, a distance between the first lens group and the second lens group increases, a distance between the second lens group and the third lens group decreases, thereby accomplishing an optical system capable of zooming and suppressing variation in distortion generated upon zooming. Moreover, upon zooming from a wide-angle end state to a telephoto end state, a distance between the third lens group and the fourth lens group varies, and a distance between the fourth lens group and the fifth lens group varies, thereby securing a high zoom ratio and accomplishing high optical performance with suppressing variation in distortion.

Moreover, upon zooming from the wide-angle end state to the telephoto end state, the first lens group is moved with respect to an image plane. With this configuration, it becomes possible to accomplish high optical performance with suppressing variation in astigmatism upon zooming from the wide-angle end state to the telephoto end state.

Moreover, in a zoom lens system seen from another point of view according to the present invention, the following conditional expression (1) is satisfied:

$$6.500 < f1/(-f2) < 10.000 \qquad (1)$$

where f1 denotes a focal length of the first lens group, and f2 denotes a focal length of the second lens group.

Conditional expression (1) defines an appropriate range of the focal length of the first lens group with respect to the focal length of the second lens group, and is for accomplishing high optical performance over entire variation range with suppressing variation in aberrations upon zooming from the wide-angle end state to the telephoto end state with securing a sufficient zoom ratio. However, conditional expression (1) has already been explained above, so that duplicated explanations are omitted.

In a zoom lens system seen from another point of view according to the present embodiment, at least one optical surface among the first lens group and the second lens group is applied with an antireflection coating, and the antireflection coating includes at least one layer that is formed by a wet process. With this configuration, a zoom lens system seen from another point of view according to the present embodiment makes it possible to further suppress ghost images and flare generated by the light rays from the object reflected from the optical surfaces, thereby accomplishing excellent optical performance.

Moreover, in a zoom lens system seen from another point of view according to the present embodiment, the antireflection coating is a multilayered film, and the layer formed by the wet process is preferably the outermost layer among the layers composing the multilayered film. With this configuration, since difference in refractive index with respect to the air can be small, reflection of light can be small, so that ghost images and flare can be further suppressed.

In a zoom lens system seen from another point of view according to the present embodiment, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can be further suppressed.

Moreover, in a zoom lens system seen from another point of view according to the present embodiment, an optical surface among the first lens group and the second lens group on which the antireflection coating is applied is preferably a concave lens surface seen from an aperture stop. Among optical surfaces in the first lens group and the second lens group, since reflection light rays are liable to be generated on a concave lens surface seen from an aperture stop, with applying the antireflection coating on such an optical surface, ghost images and flare can be effectively suppressed.

Moreover, in a zoom lens system seen from another point of view according to the present embodiment, a concave lens surface seen from an aperture stop among the first lens group and the second lens group on which the antireflection coating is applied is preferably an image side lens surface. Among optical surfaces in the first lens group and the second lens group, since reflection light rays are liable to be generated on a concave lens surface seen from an aperture stop, with applying the antireflection coating on such an optical surface, ghost images and flare can be effectively suppressed.

Moreover, in a zoom lens system seen from another point of view according to the present embodiment, a concave lens surface seen from an aperture stop among the first lens group and the second lens group on which the antireflection coating is applied is preferably an object side lens surface. Among optical surfaces in the first lens group and the second lens group, since reflection light rays are liable to be generated on a concave lens surface seen from an aperture stop, with applying the antireflection coating on such an optical surface, ghost images and flare can be effectively suppressed.

Moreover, in a zoom lens system seen from another point of view according to the present embodiment, an optical surface among the first lens group and the second lens group on which the antireflection coating is applied is preferably a concave lens surface seen from the object. Among optical surfaces in the first lens group and the second lens group, since reflection light rays are liable to be generated on a concave lens surface seen from the object, with applying the antireflection coating on such an optical surface, ghost images and flare can be effectively suppressed.

Moreover, in a zoom lens system seen from another point of view according to the present embodiment, a concave surface seen from the object among the first lens group and the second lens group on which the antireflection coating is applied is preferably an image side lens surface of the image side second lens from the most object side lens in the first lens group. Among optical surfaces in the first lens group, since reflection light rays are liable to be generated on a concave lens surface seen from the object, with applying the antireflection coating on such an optical surface, ghost images and flare can be effectively suppressed.

Moreover, in a zoom lens system seen from another point of view according to the present embodiment, a concave surface seen from the object among the first lens group and the second lens group on which the antireflection coating is applied is preferably an object side lens surface of the image side second lens from the most object side lens in the second lens group. Among optical surfaces in the second lens group, since reflection light rays are liable to be generated on a concave lens surface seen from the object, with applying the antireflection coating on such an optical surface, ghost images and flare can be effectively suppressed.

Moreover, in a zoom lens system seen from another point of view according to the present embodiment, a concave surface seen from the object among the first lens group and the second lens group on which the antireflection coating is applied is preferably an image side lens surface of the image side third lens from the most object side lens in the second lens group. Among optical surfaces in the second lens group, since reflection light rays are liable to be generated on a concave lens surface seen from the object, with applying the antireflection coating on such an optical surface, ghost images and flare can be effectively suppressed.

Moreover, in a zoom lens system seen from another point of view according to the present embodiment, a concave surface seen from the object among the first lens group and the second lens group on which the antireflection coating is applied is preferably an object side lens surface of the image side fourth lens from the most object side lens in the second lens group. Among optical surfaces in the second lens group, since reflection light rays are liable to be generated on a concave lens surface seen from the object, with applying the antireflection coating on such an optical surface, ghost images and flare can be effectively suppressed.

Moreover, in a zoom lens system seen from another point of view according to the present embodiment, the antireflection coating may also be formed by a dry process etc without being limited to the wet process. On this occasion, it is preferable that the antireflection coating contains at least one layer whose refractive index is equal to 1.30 or less. In this way, the same effects as in the case of using the wet process can be obtained by forming the antireflection coating based on the dry process etc. In this case, the layer whose refractive index is equal to 1.30 or less is preferably the outermost layer among the layers composing the multilayered film.

Moreover, in a zoom lens system seen from another point of view according to the present invention, the following conditional expression (2) is preferably satisfied:

$$0.500 < f3/(-f4) < 1.300 \qquad (2)$$

where f3 denotes a focal length of the third lens group, and f4 denotes a focal length of the fourth lens group.

Conditional expression (2) defines an appropriate range of the focal length of the third lens group and the focal length of the fourth lens group, and is for accomplishing high optical performance over entire zoom range. However, conditional expression (2) has already been explained above, so that duplicated explanations are omitted.

Moreover, in a zoom lens system seen from another point of view according to the present invention, the following conditional expression (3) is preferably satisfied:

$$3.900 < f1/fw < 11.000 \qquad (3)$$

where f1 denotes the focal length of the first lens group, and fw denotes a focal length of the zoom lens system in the wide-angle end state.

Conditional expression (3) defines an appropriate range of the focal length of the first lens group, and is for accomplishing high optical performance with suppressing variation in off-axis aberrations generated upon zooming from the wide-angle end state to the telephoto end state. However, conditional expression (3) has already been explained above, so that duplicated explanations are omitted.

Moreover, in a zoom lens system seen from another point of view according to the present invention, the following conditional expression (4) is preferably satisfied:

$$0.280 < f1/ft < 0.520 \qquad (4)$$

where f1 denotes the focal length of the first lens group, and ft denotes a focal length of the zoom lens system in the telephoto end state.

Conditional expression (4) defines an appropriate range of the focal length of the first lens group, and is for accomplishing high optical performance with suppressing variation in aberrations generated upon zooming from the wide-angle end state to the telephoto end state. However, conditional expression (4) has already been explained above, so that duplicated explanations are omitted.

Moreover, in a zoom lens system seen from another point of view according to the present invention, the following conditional expression (5) is preferably satisfied:

$$0.0300 < (-f2)/ft < 0.0700 \qquad (5)$$

where f2 denotes the focal length of the second lens group, and ft denotes a focal length of the zoom lens system in the telephoto end state.

Conditional expression (5) is for accomplishing high optical performance with suppressing variation in aberrations generated in the second lens group with correcting variation in aberrations generated in the first lens group upon zooming from the wide-angle end state to the telephoto end state. However, conditional expression (5) has already been explained above, so that duplicated explanations are omitted.

Moreover, in a zoom lens system seen from another point of view according to the present invention, the following conditional expression (6) is preferably satisfied:

$$0.050 < f3/ft < 0.150 \qquad (6)$$

where ft denotes the focal length of the zoom lens system in the telephoto end state, and f3 denotes a focal length of the third lens group.

Conditional expression (6) is for accomplishing high optical performance with suppressing variations in aberrations generated in the third lens group with correcting variations in aberrations generated in the first lens group upon zooming from the wide-angle end state to the telephoto end state. However, conditional expression (6) has already been explained above, so that duplicated explanations are omitted.

Moreover, in a zoom lens system seen from another point of view according to the present invention, the first lens group preferably is moved to the object side with respect to the image plane upon zooming from the wide-angle end state to the telephoto end state. With this configuration, refractive power of the first lens group can be made weak, so that it becomes possible to accomplish high optical performance with suppressing variation in astigmatism generated upon zooming from the wide-angle end state to the telephoto end state.

Moreover, in a zoom lens system seen from another point of view according to the present invention, it is preferable that a distance between the third lens group and the fourth lens group increases, and a distance between the fourth lens group and the fifth lens group decreases upon zooming from the wide-angle end state to the telephoto end state. With this configuration, a position of a combined principal point of the third through fifth lens groups in the telephoto end state can be moved toward the object side from a position of a combined principal point of the third through fifth lens groups in the wide-angle end state, so that zooming can be effectively carried out. Accordingly, refractive power or the moving amount of each lens group can be suppressed by just that much, so that high optical performance can be accomplished.

Moreover, in a zoom lens system seen from another point of view according to the present invention, upon zooming from the wide-angle end state to the telephoto end state the third lens group and the fifth lens group are preferably moved in a body with respect to the image plane. With this configuration, it becomes possible to construct the third lens group and the fifth lens group in a body, so that a mutual decentering amount between the third lens group and the fifth lens group generated by the manufacturing error can be suppressed, so that generation of decentering coma generated between the third lens group and the fifth lens group can be suppressed. Moreover, high optical performance can be accomplished with suppressing variation in astigmatism upon zooming.

Moreover, in a zoom lens system seen from another point of view according to the present invention, an aperture stop is preferably disposed to the image side of the second lens group. With this configuration, high optical performance can be accomplished with suppressing variation in distortion generated upon zooming from the wide-angle end state to the telephoto end state.

Moreover, in a zoom lens system seen from another point of view according to the present invention, an aperture stop is preferably disposed between the second lens group and the third lens group. With this configuration, high optical performance can be accomplished with suppressing variation in distortion generated upon zooming from the wide-angle end state to the telephoto end state.

Moreover, in a zoom lens system seen from another point of view according to the present invention, upon zooming from the wide-angle end state to the telephoto end state an aperture stop is preferably moved in a body with the third lens group. With this configuration, variation in the height of the off-axis ray passing through the third lens group can be suppressed, and variations in coma, curvature of field and astigmatism can be suppressed, so that high optical performance can be accomplished.

Moreover, an optical apparatus seen from another point of view according to the present invention is characterized by including the above-described zoom lens system. With this configuration, it becomes possible to accomplish an optical apparatus having high optical performance.

Moreover, a method for manufacturing a zoom lens system seen from another point of view according to the present invention is a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising steps of:

applying an antireflection coating on at least one optical surface among the first lens group and the second lens group, and the antireflection coating including at least one layer that is formed by a wet process;

disposing the first lens group, the second lens group, the third lens group, the fourth lens group, and the fifth lens group such that upon zooming from a wide-angle end state to a telephoto end state the first lens group is moved with respect to an image plane, a distance between the first lens group and the second lens group increases, a distance between the second lens group and the third lens group decreases, a distance between the third lens group and the fourth lens group varies, and a distance between the fourth lens group and the fifth lens group varies; and satisfying the following conditional expression (1):

$$6.500 < f1/(-f2) < 10.000 \quad (1)$$

where f1 denotes a focal length of the first lens group, and f2 denotes a focal length of the second lens group.

With this method for manufacturing a zoom lens system seen from another point of view, it becomes possible to manufacture a zoom lens system having sufficiently high optical performance.

NUMERICAL EXAMPLES

Each numerical example of a zoom lens system according to the present invention is explained below with reference to accompanying drawings.

Example 1

FIG. 1 is a sectional view showing a lens configuration of a zoom lens system according to Example 1 of the present invention.

As shown in FIG. 1, the zoom lens system ZL1 according to Example 1 of the present invention is composed of, in order from an object side along an optical axis, a first lens group G1 having positive refractive power, a second lens group G2 having negative refractive power, a third lens group G3 having positive refractive power, a fourth lens group G4 having negative refractive power, and a fifth lens group G5 having positive refractive power.

In the zoom lens system ZL1 according to Example 1, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases. Moreover, with respect to the image plane I, the first lens group G1 is moved monotonously to the object side, the second lens group G2 to the object side, the third lens group G3, the fourth lens group G4, and the fifth lens group G5 monotonously to the object side. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3.

The first lens group G1 is composed of, in order from the object side along the optical axis, a cemented lens constructed by a negative meniscus lens L11 having a convex surface facing the object side cemented with a double convex positive lens L12, and a double convex positive lens L13.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is applied with a resin layer on which an aspherical surface is formed.

The third lens group G3 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The fourth lens group G4 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the fourth lens group G4 is a glass-mold type aspherical lens whose object side lens surface is formed as an aspherical surface.

The fifth lens group G5 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the fifth lens group G5 is a glass mold type aspherical lens whose object side lens surface is formed as an aspherical surface. Light rays come out from the lens L54 form an image on the image plane I.

In the zoom lens system ZL1 seen from another point of view according to Example 1, an antireflection coating explained later is applied to the image side lens surface (surface number 8) of the negative meniscus lens L21 in the second lens group G2 and the object side lens surface (surface number 9) of the double concave negative lens L22 in the second lens group G2.

Various values associated with the zoom lens system ZL1 according to Example 1 are listed in Table 1.

In (Specifications), f denotes a focal length of the zoom lens system, FNO denotes an f-number, ω denotes a half angle of view (unit: degree), Y denotes an image height, TL denotes a total lens length which is a distance between the most object side lens surface of the first lens group G1 and the image plane I upon focusing on an infinitely distant object, W denotes a wide-angle end state, M denotes an intermediate focal length state, and T denotes a telephoto end state.

In (Lens Surface Data), the left most column "m" shows the lens surface number counted in order from the object side, the second column "r" shows a radius of curvature of the lens surface, the third column "d" shows a distance to the next surface, the fourth column "nd" shows a refractive index at d-line (wavelength λ=587.6 nm), and the fifth column "vd" shows an Abbe number at d-line (wavelength λ=587.6 nm). Moreover, "OP" denotes an object plane, and "I" denotes an image plane. In the second column "r", r=∞ represents a plane surface. In the fifth column "nd", the refractive index of the air nd=1.000000 is omitted. An aspherical surface is expressed by attaching "*" to the left side of the lens surface number, and a paraxial radius of curvature is shown in the second column "r".

In (Aspherical Surface Data), the aspherical surface is exhibited by the following expression:

$$X = (h^2/r)/[1 + \{1 - \kappa \times (h^2/r^2)\}^{1/2}] + A4 \times h^4 + A6 \times h^6 + A8 \times h^8 + A10 \times h^{10}$$

where "h" denotes a vertical height from the optical axis, x denotes a distance along the optical axis from the tangent surface at the vertex of the aspherical surface to the aspherical surface at the vertical height h from the optical axis, r denotes a radius of curvature of a reference sphere (paraxial radius of curvature), κ denotes a conical coefficient, and An denotes an aspherical coefficient of n-th order.

In (Aspherical Surface Data), "E-n" denotes "×10$^{-n}$", in which "n" is an integer, and for example "1.234E-05" denotes "1.234×10$^{-5}$".

In (Variable Distances), values for focal lengths, variable distances, and diameters φ of the aperture stop S are shown.

In (Lens Group Data), a starting surface number "ST" and a focal length of each lens group are shown.

In (Values for Conditional Expressions), values for respective conditional expressions are shown.

In respective tables for various values shown in Table 1, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

(Specifications)

|   | W | M | T |
|---|---|---|---|
| f = | 18.56080 | 104.15546 | 291.57422 |
| FNO = | 3.60 | 5.60 | 5.87 |
| 2ω = | 77.91 | 14.91 | 5.42 |
| Y = | 14.20 | 14.20 | 14.20 |
| TL = | 163.29692 | 225.59510 | 252.97281 |

(Lens Surface Data)

| m | r | d | nd | vd |
|---|---|---|---|---|
| OP | ∞ | | | |
| 1) | 205.09180 | 2.00000 | 1.882997 | 40.76 |
| 2) | 67.52420 | 9.07190 | 1.456000 | 91.20 |
| 3) | −361.42710 | 0.10000 | | |
| 4) | 70.10040 | 6.86700 | 1.603001 | 65.46 |
| 5) | −2470.83790 | (D5) | | |
| *6) | 84.76870 | 0.15000 | 1.553890 | 38.09 |
| 7) | 73.93750 | 1.20000 | 1.834807 | 42.72 |
| 8) | 17.03670 | 6.46970 | | |
| 9) | −49.48220 | 1.00000 | 1.816000 | 46.62 |
| 10) | 52.14060 | 0.15000 | | |
| 11) | 31.61490 | 5.45080 | 1.761820 | 26.56 |
| 12) | −44.44820 | 1.19350 | | |
| 13) | −25.13580 | 1.00000 | 1.816000 | 46.62 |
| 14) | 64.50360 | 2.42190 | 1.808090 | 22.79 |
| 15) | −166.54310 | (D15) | | |
| 16) | ∞ | 1.00000 | Aperture Stop S | |
| 17) | 63.10220 | 3.49130 | 1.593190 | 67.87 |
| 18) | −50.22150 | 0.10000 | | |
| 19) | 58.68260 | 2.72200 | 1.487490 | 70.41 |
| 20) | −121.43450 | 0.10000 | | |
| 21) | 48.64320 | 4.10420 | 1.487490 | 70.41 |
| 22) | −34.50080 | 1.00000 | 1.808090 | 22.79 |
| 23) | −205.15990 | (D23) | | |
| *24) | −66.96860 | 1.00000 | 1.693501 | 53.20 |
| 25) | 26.57120 | 2.15810 | 1.761820 | 26.56 |
| 26) | 63.33840 | 4.78730 | | |
| 27) | −24.70410 | 1.00000 | 1.729157 | 54.66 |
| 28) | −74.86360 | (D28) | | |
| *29) | −569.79420 | 3.96090 | 1.589130 | 61.16 |
| 30) | −23.53500 | 0.10000 | | |
| 31) | 37.14850 | 5.00600 | 1.487490 | 70.41 |
| 32) | −45.19690 | 1.71640 | | |
| 33) | −107.03630 | 1.00000 | 1.882997 | 40.76 |
| 34) | 23.36210 | 4.50160 | 1.548141 | 45.79 |
| 35) | −637.55850 | (BF) | | |
| I | ∞ | | | |

(Aspherical Surface Data)

Surface Number: 6

κ = 1.0000
A4 = 3.61880E−06
A6 = −6.10680E−09
A8 = −4.67380E−12
A10 = 5.77660E−14

Surface Number: 24

κ = 1.0000
A4 = 3.81940E−06
A6 = −1.72450E−09
A8 = 0.00000E+00
A10 = 0.00000E+00

Surface Number: 29

κ = 1.0000
A4 = −1.63630E−05
A6 = 8.94380E−09
A8 = −2.98150E−11
A10 = 2.87630E−14

TABLE 1-continued

(Variable Distances)

| | W | M | T |
|---|---|---|---|
| f = | 18.56080 | 104.15546 | 291.57422 |
| D5 = | 2.14670 | 55.86030 | 80.53690 |
| D15 = | 34.33830 | 11.46250 | 2.00000 |
| D23 = | 3.38750 | 10.66930 | 11.83690 |
| D28 = | 9.44940 | 2.16760 | 1.00000 |
| BF = | 39.15242 | 70.61280 | 82.77641 |
| φ = | 16.20 | 18.00 | 19.90 |

(Lens Group Data)

| Group | ST | focal length |
|---|---|---|
| G1 | 1 | 122.10406 |
| G2 | 6 | −15.86654 |
| G3 | 16 | 26.56694 |
| G4 | 24 | −24.00147 |
| G5 | 29 | 33.81791 |

(Values for Conditional Expressions)

| | |
|---|---|
| (1) f1/(−f2) = | 7.696 |
| (2) f3/(−f4) = | 1.107 |
| (3) f1/fw = | 6.579 |
| (4) f1/ft = | 0.419 |
| (5) (−f2)/ft = | 0.0544 |
| (6) f3/ft = | 0.0911 |

Figure 2A:
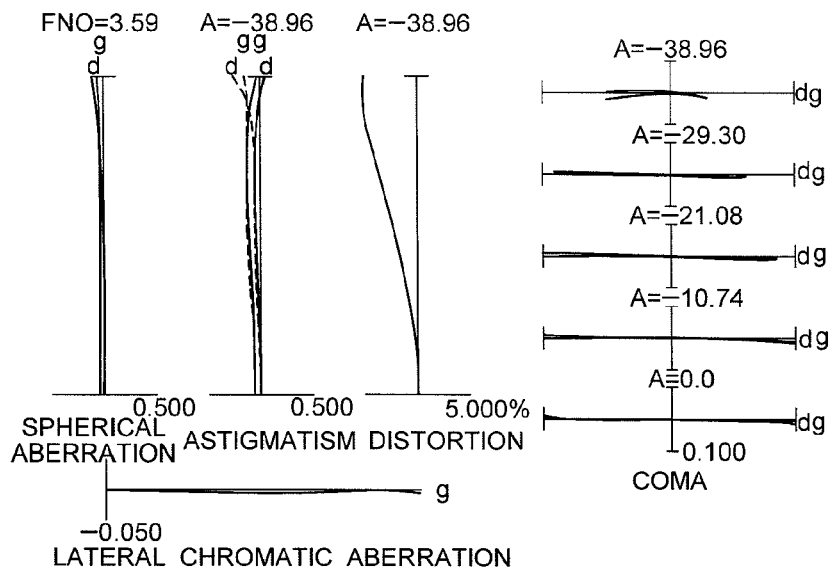
Figure 2B:
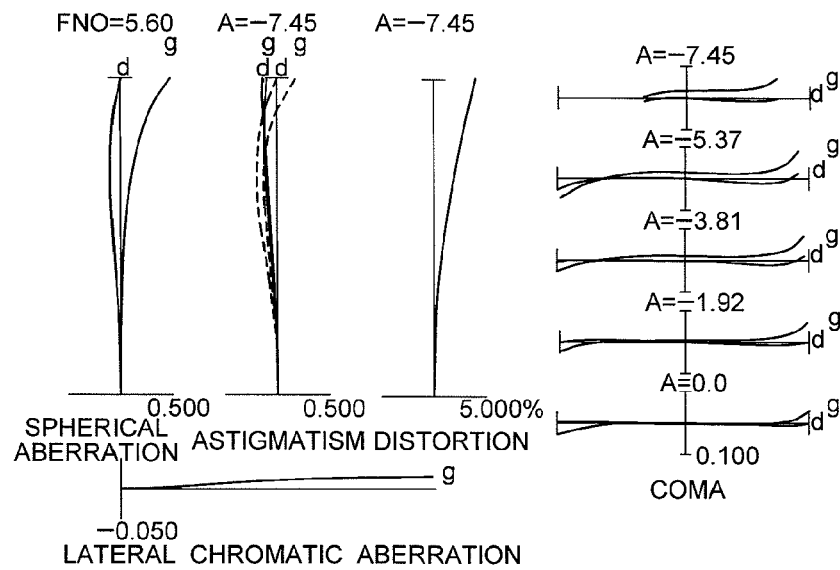
Figure 2C:
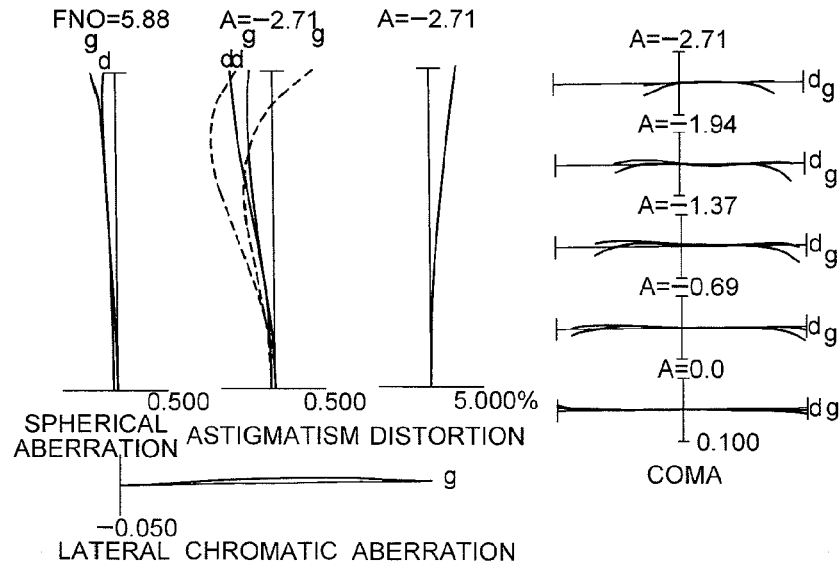

FIGS. 2A, 2B and 2C are graphs showing various aberrations of the zoom lens system according to Example 1 upon focusing on an infinitely distant object, in which FIG. 2A shows in a wide-angle end state, FIG. 2B shows in an intermediate focal length state, and FIG. 2C shows in a telephoto end state.

In graphs showing aberrations, FNO denotes an f-number, and A denotes a half angle of view (unit: degree). In graphs "d" denotes an aberration curve at d-line (587.6 nm), and "g" denotes an aberration curve at g-line (435.8 nm), and an aberration curve without any notation shows an aberration curve at d-line. In graphs showing astigmatism, a solid line indicates a sagittal image plane, and a broken line indicates a meridional image plane. In graphs showing coma, each meridional coma of a half angle of view at d-line and g-line is shown. The explanations of reference symbols are the same in the other Examples.

As is apparent from various graphs, the zoom lens system ZL1 according to Example 1 shows superb optical performance as a result of good corrections to various aberrations in each focal length state from the wide-angle end state through the telephoto end state.

As shown in FIG. 3, when light rays BM from an object are incident on the zoom lens system seen from another point of view, a portion of the rays BM are reflected by the object side lens surface (a first-ghost-generating surface whose surface number is 9) of the double concave negative lens L22, and the reflected light rays are reflected again by the image side lens surface (a second-ghost-generating surface whose surface number is 8) of the negative meniscus lens L21 to reach the image plane I with generating ghost images. Incidentally, the first-ghost-generating surface 9 is a concave surface seen from the object, and the second-ghost-generating surface 8 is a concave surface seen from the aperture stop S. With applying an antireflection coating corresponding to a broad wavelength range and a wide incident angle explained later to such lens surfaces, it becomes possible to effectively suppress ghost images and flare.

Example 2

Figure 4:
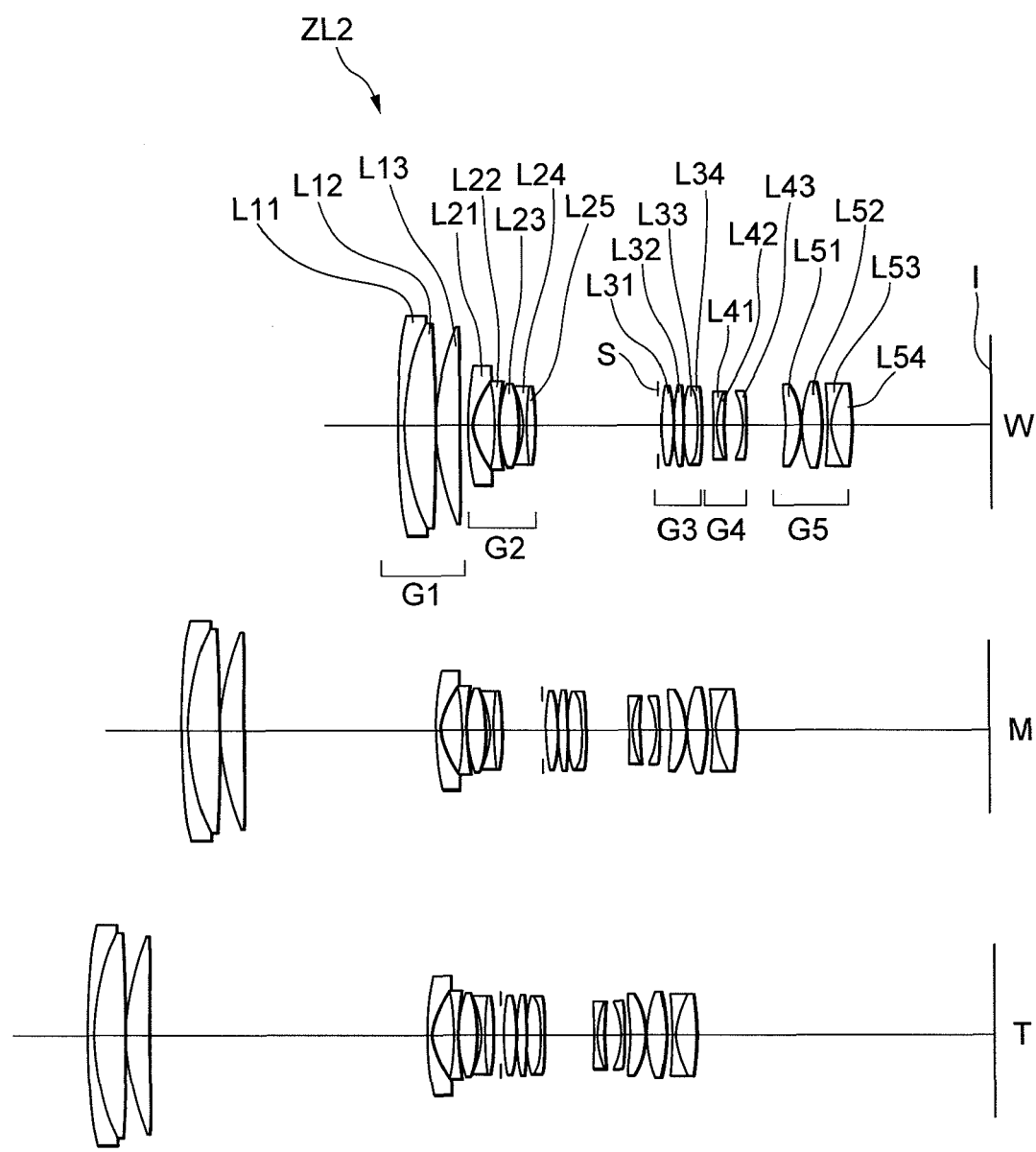
FIG. 4 is a sectional view showing a lens configuration of a zoom lens system according to Example 2 of the present invention.

FIG. 4 is a sectional view showing a lens configuration of a zoom lens system ZL2 according to Example 2 of the present invention.

As shown in FIG. 4, the zoom lens system ZL2 according to Example 2 of the present invention is composed of, in order from an object side along an optical axis, a first lens group G1 having positive refractive power, a second lens group G2 having negative refractive power, a third lens group G3 having positive refractive power, a fourth lens group G4 having negative refractive power, and a fifth lens group G5 having positive refractive power.

In the zoom lens system ZL2 according to Example 2, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases. Moreover, with respect to the image plane I, the first lens group G1 is moved monotonously to the object side, the second lens group G2 to the object side, the third lens group G3, the fourth lens group G4, and the fifth lens group G5 monotonously to the object side. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is applied with a resin layer on which an aspherical surface is formed.

The third lens group G3 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The fourth lens group G4 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the fourth lens group G4 is a compound type aspherical lens whose object side lens surface is applied with a resin layer on which an aspherical surface is formed.

The fifth lens group G5 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the fifth lens group G5 is a glass mold type aspherical lens whose object side lens surface is formed as an aspherical surface. Light rays come out from the lens L54 form an image on the image plane I.

In the zoom lens system ZL2 seen from another point of view according to Example 2, an antireflection coating explained later is applied to the object side lens surface (surface number 4) of the positive meniscus lens L13 in the first lens group G1 and the image side lens surface (surface number 12) of the double convex positive lens L23 in the second lens group G2.

Various values associated with the zoom lens system ZL2 according to Example 2 are listed in Table 2.

TABLE 2

(Specifications)

| | W | M | T |
|---|---|---|---|
| f = | 18.52363 | 104.52143 | 291.21725 |
| FNO = | 3.61 | 5.69 | 5.90 |
| 2ω = | 77.78 | 14.84 | 5.42 |
| Y = | 14.20 | 14.20 | 14.20 |
| TL = | 164.74420 | 225.48860 | 251.39424 |

(Lens Surface Data)

| m | r | d | nd | νd |
|---|---|---|---|---|
| OP | ∞ | | | |
| 1) | 186.59960 | 2.20000 | 1.834000 | 37.17 |
| 2) | 69.08900 | 8.80000 | 1.497820 | 82.56 |
| 3) | −494.44545 | 0.10000 | | |
| 4) | 73.40222 | 6.45000 | 1.593190 | 67.87 |
| 5) | 2016.71160 | (D5) | | |
| *6) | 84.85000 | 0.10000 | 1.553890 | 38.09 |
| 7) | 74.02192 | 1.20000 | 1.834810 | 42.72 |
| 8) | 17.09747 | 6.95000 | | |
| 9) | −37.97970 | 1.00000 | 1.816000 | 46.63 |
| 10) | 77.67127 | 0.15000 | | |
| 11) | 36.26557 | 5.30000 | 1.784720 | 25.68 |
| 12) | −36.26557 | 0.80000 | | |
| 13) | −25.69642 | 1.00000 | 1.816000 | 46.63 |
| 14) | 66.08300 | 2.05000 | 1.808090 | 22.79 |
| 15) | −666.70366 | (D15) | | |
| 16) | ∞ | 1.00000 | Aperture Stop S | |
| 17) | 68.30727 | 3.40000 | 1.593190 | 67.87 |
| 18) | −47.99596 | 0.10000 | | |
| 19) | 68.52367 | 2.45000 | 1.487490 | 70.45 |
| 20) | −136.98392 | 0.10000 | | |
| 21) | 46.52671 | 4.20000 | 1.487490 | 70.45 |
| 22) | −36.16400 | 1.00000 | 1.808090 | 22.79 |
| 23) | −202.95328 | (D23) | | |
| *24) | −55.09840 | 0.20000 | 1.553890 | 38.09 |
| 25) | −57.24715 | 0.90000 | 1.696800 | 55.52 |
| 26) | 28.15100 | 2.15000 | 1.728250 | 28.46 |
| 27) | 87.70856 | 4.35000 | | |
| 28) | −26.69877 | 1.00000 | 1.729160 | 54.66 |
| 29) | −76.47707 | (D29) | | |
| *30) | −333.89500 | 4.65000 | 1.589130 | 61.18 |
| 31) | −24.64395 | 0.10000 | | |
| 32) | 31.19625 | 5.85000 | 1.487490 | 70.45 |
| 33) | −43.38887 | 1.45000 | | |
| 34) | −109.71645 | 1.00000 | 1.883000 | 40.77 |
| 35) | 20.29920 | 5.30000 | 1.548140 | 45.79 |
| 36) | −808.81321 | (BF) | | |
| I | ∞ | | | |

(Aspherical Surface Data)

Surface Number: 6

| κ = | 1.0000 |
|---|---|
| A4 = | 3.13350E−06 |
| A6 = | 4.73080E−10 |
| A8 = | −3.40500E−11 |
| A10 = | 1.16620E−13 |

TABLE 2-continued

Surface Number: 24

| κ = | 1.0000 |
|---|---|
| A4 = | 5.24030E−06 |
| A6 = | −2.00730E−09 |
| A8 = | 0.00000E+00 |
| A10 = | 0.00000E+00 |

Surface Number: 30

| κ = | 1.0000 |
|---|---|
| A4 = | −1.54020E−05 |
| A6 = | 1.69500E−09 |
| A8 = | 1.34490E−11 |
| A10 = | −2.07220E−13 |

(Variable Distances)

| | W | M | T |
|---|---|---|---|
| f = | 18.52363 | 104.52143 | 291.21725 |
| D5 = | 2.15700 | 53.25650 | 76.94960 |
| D15 = | 33.80140 | 11.31350 | 2.00000 |
| D23 = | 3.45650 | 11.60170 | 13.04330 |
| D29 = | 10.58680 | 2.44160 | 1.00000 |
| BF = | 39.44250 | 71.57530 | 83.10134 |
| φ = | 15.80 | 17.50 | 19.60 |

(Lens Group Data)

| Group | ST | focal length |
|---|---|---|
| G1 | 1 | 118.96910 |
| G2 | 6 | −15.62542 |
| G3 | 16 | 27.17463 |
| G4 | 24 | −25.41506 |
| G5 | 30 | 34.39022 |

(Values for Conditional Expressions)

| (1) f1/(−f2) = | 7.614 |
|---|---|
| (2) f3/(−f4) = | 1.069 |
| (3) f1/fw = | 6.423 |
| (4) f1/ft = | 0.409 |
| (5) (−f2)/ft = | 0.0537 |
| (6) f3/ft = | 0.0933 |

Figure 5A:
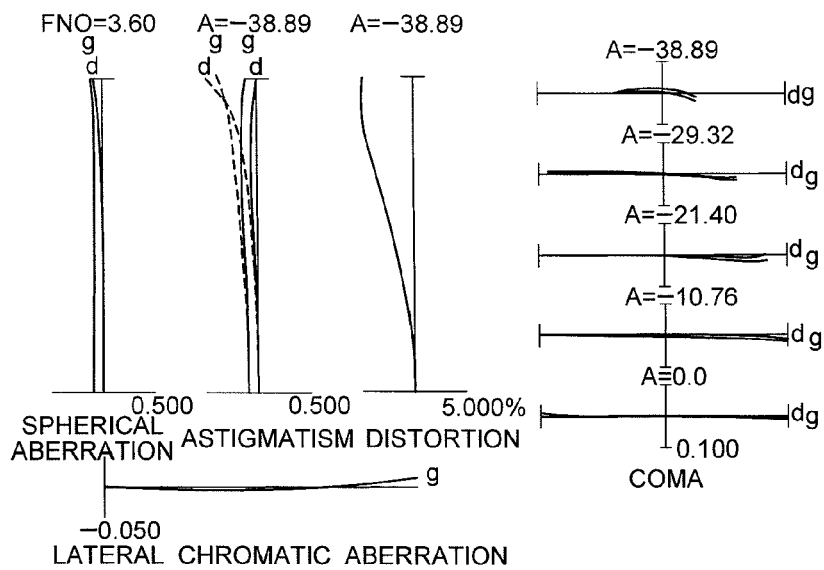
Figure 5B:
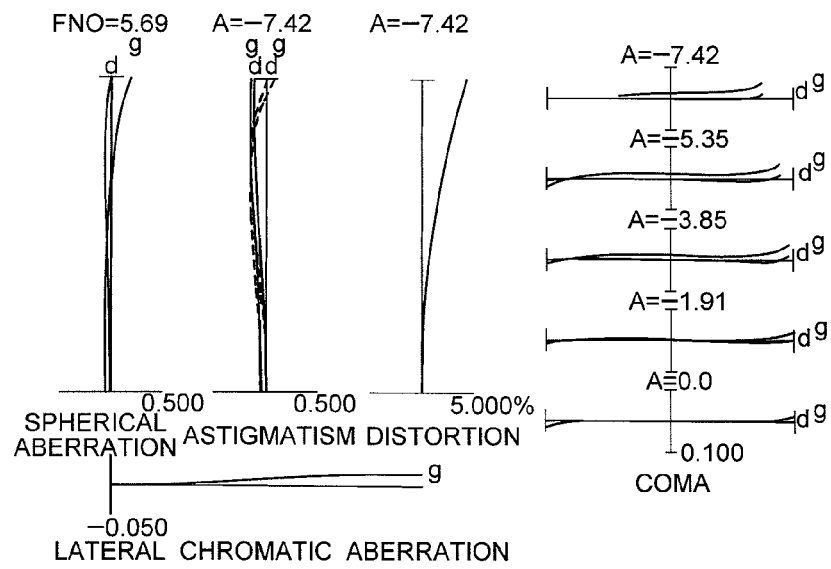
Figure 5C:
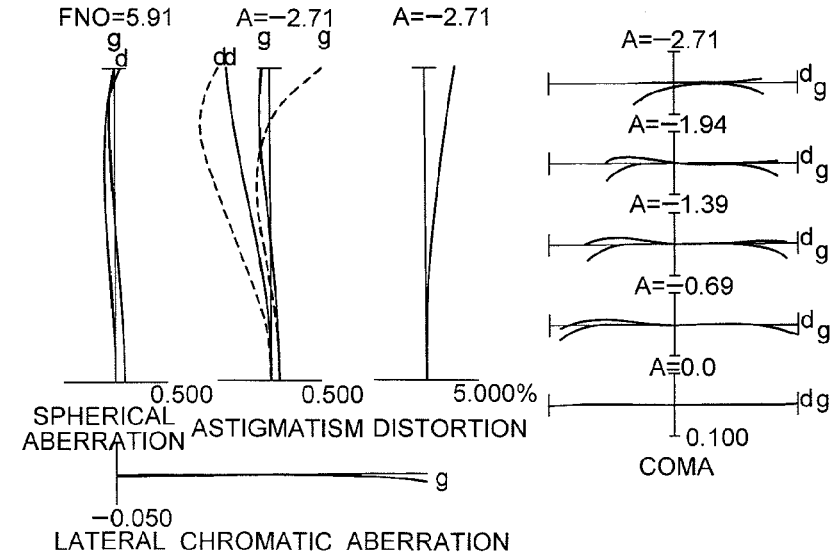

FIGS. 5A, 5B and 5C are graphs showing various aberrations of the zoom lens system according to Example 2 upon focusing on an infinitely distant object, in which FIG. 5A shows in a wide-angle end state, FIG. 5B shows in an intermediate focal length state, and FIG. 5C shows in a telephoto end state.

As is apparent from various graphs, the zoom lens system ZL2 according to Example 2 shows superb optical performance as a result of good corrections to various aberrations in each focal length state from the wide-angle end state through the telephoto end state.

Example 3

Figure 6:
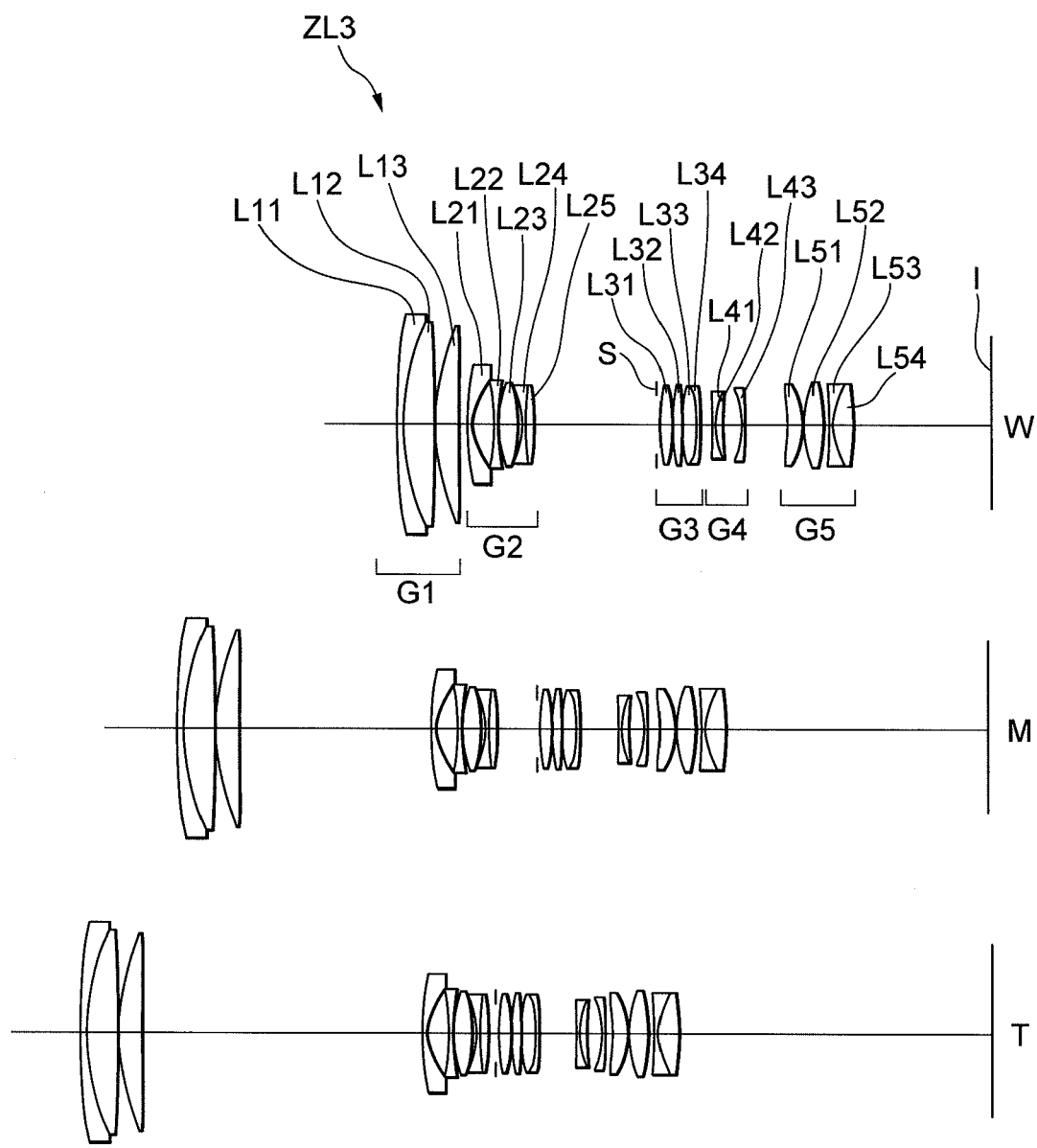
FIG. 6 is a sectional view showing a lens configuration of a zoom lens system according to Example 3 of the present invention.

FIG. 6 is a sectional view showing a lens configuration of a zoom lens system ZL3 according to Example 3 of the present invention.

As shown in FIG. 6, the zoom lens system ZL3 according to Example 3 of the present invention is composed of, in order from an object side along an optical axis, a first lens group G1 having positive refractive power, a second lens group G2 having negative refractive power, a third lens group G3 having positive refractive power, a fourth lens group G4 having negative refractive power, and a fifth lens group G5 having positive refractive power.

In the zoom lens system ZL3 according to Example 3, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases. Moreover, with respect to the image plane I, the first lens group G1 is moved monotonously to the object side, the second lens group G2 to the object side, and the third lens group G3, the fourth lens group G4, and the fifth lens group G5 monotonously to the object side.

An aperture stop S is disposed to the most object side of the third lens group G3, which is disposed to the image side of the second lens group G2, and constructed integrally with the third lens group G3.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is applied with a resin layer on which an aspherical surface is formed.

The third lens group G3 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The fourth lens group G4 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the fourth lens group G4 is a compound type aspherical lens whose object side lens surface is applied with a resin layer on which an aspherical surface is formed.

The fifth lens group G5 is composed of, in order from the object side along the optical axis, a double convex positive lens L51, a double convex positive lens L52, and a cemented lens constructed by a double concave negative lens L53 cemented with a double convex positive lens L54. The double convex positive lens L51 disposed to the most object side of the fifth lens group G5 is a glass mold type aspherical lens whose object side lens surface is formed as an aspherical surface. Light rays come out from the lens L54 form an image on the image plane I.

In the zoom lens system ZL3 seen from another point of view according to Example 3, an antireflection coating explained later is applied to the image side lens surface (surface number 3) of the double convex positive lens L12 in the first lens group G1 and the image side lens surface (surface number 12) of the double convex positive lens L23 in the second lens group G2.

Various values associated with the zoom lens system ZL3 according to Example 3 are listed in Table 3.

TABLE 3

(Specifications)

| | W | M | T |
|---|---|---|---|
| f = | 18.56060 | 104.65150 | 291.42454 |
| FNO = | 3.58 | 5.62 | 5.81 |
| 2ω = | 77.60 | 14.88 | 5.44 |
| Y = | 14.20 | 14.20 | 14.20 |
| TL = | 164.76435 | 225.28899 | 251.61470 |

(Lens Surface Data)

| m | r | d | nd | vd |
|---|---|---|---|---|
| OP | ∞ | | | |
| 1) | 175.60560 | 2.20000 | 1.834000 | 37.16 |
| 2) | 67.43020 | 8.80000 | 1.497820 | 82.52 |
| 3) | −587.78480 | 0.10000 | | |
| 4) | 72.27100 | 6.45000 | 1.593190 | 67.87 |
| 5) | 1826.13880 | (D5) | | |
| *6) | 84.76870 | 0.10000 | 1.553890 | 38.09 |
| 7) | 73.93750 | 1.20000 | 1.834807 | 42.72 |
| 8) | 17.18730 | 6.95000 | | |
| 9) | −36.98220 | 1.00000 | 1.816000 | 46.62 |
| 10) | 77.92630 | 0.15000 | | |
| 11) | 36.63460 | 5.30000 | 1.784723 | 25.68 |
| 12) | −36.63460 | 0.80000 | | |
| 13) | −26.19910 | 1.00000 | 1.816000 | 46.62 |
| 14) | 63.73960 | 2.05000 | 1.808090 | 22.79 |
| 15) | −643.27060 | (D15) | | |
| 16) | ∞ | 1.00000 | Aperture Stop S | |
| 17) | 65.83650 | 3.40000 | 1.593190 | 67.87 |
| 18) | −50.15460 | 0.10000 | | |
| 19) | 65.68170 | 2.45000 | 1.487490 | 70.41 |
| 20) | −154.97430 | 0.10000 | | |
| 21) | 46.73330 | 4.20000 | 1.487490 | 70.41 |
| 22) | −35.78330 | 1.00000 | 1.808090 | 22.79 |
| 23) | −191.93180 | (D23) | | |
| *24) | −57.29660 | 0.20000 | 1.553890 | 38.09 |
| 25) | −59.72500 | 0.90000 | 1.696797 | 55.52 |
| 26) | 28.51000 | 2.15000 | 1.728250 | 28.46 |
| 27) | 91.99760 | 4.14020 | | |
| 28) | −32.89540 | 1.00000 | 1.729157 | 54.66 |
| 29) | −144.33150 | (D29) | | |
| *30) | 6427.19190 | 4.65000 | 1.589130 | 61.18 |
| 31) | −27.38180 | 0.10000 | | |
| 32) | 31.47760 | 5.85000 | 1.487490 | 70.41 |
| 33) | −43.75390 | 1.45000 | | |
| 34) | −113.58970 | 1.00000 | 1.882997 | 40.76 |
| 35) | 20.34810 | 5.30000 | 1.548141 | 45.79 |
| 36) | −709.14530 | (BF) | | |
| I | ∞ | | | |

(Aspherical Surface Data)

Surface Number: 6

| κ = | 1.0000 |
|---|---|
| A4 = | 2.88220E−06 |
| A6 = | −2.29350E−11 |
| A8 = | −2.35280E−11 |
| A10 = | 9.21570E−14 |

Surface Number: 24

| κ = | 1.0000 |
|---|---|
| A4 = | 4.32780E−06 |
| A6 = | 1.88460E−09 |
| A8 = | 0.00000E+00 |
| A10 = | 0.00000E+00 |

Surface Number: 30

| κ = | 1.0000 |
|---|---|
| A4 = | −1.36170E−05 |
| A6 = | −3.55860E−10 |
| A8 = | 1.83080E−11 |
| A10 = | −1.86790E−13 |

TABLE 3-continued (Variable Distances)

|  | W | M | T |
|---|---|---|---|
| f = | 18.56060 | 104.65150 | 291.42454 |
| D5 = | 2.15700 | 53.01000 | 76.25220 |
| D15 = | 33.36360 | 11.30360 | 2.00000 |
| D23 = | 3.46820 | 9.64300 | 9.62460 |
| D29 = | 11.83830 | 2.66290 | 1.00000 |
| BF = | 38.84705 | 73.57929 | 86.64770 |
| φ = | 15.80 | 17.50 | 19.60 |

(Lens Group Data)

| Group | ST | focal length |
|---|---|---|
| G1 | 1 | 117.72937 |
| G2 | 6 | −15.60945 |
| G3 | 16 | 27.35473 |
| G4 | 24 | −26.50041 |
| G5 | 30 | 35.20423 |

(Values for Conditional Expressions)

| | |
|---|---|
| (1) f1/(−f2) = | 7.542 |
| (2) f3/(−f4) = | 1.032 |
| (3) f1/fw = | 6.343 |
| (4) f1/ft = | 0.404 |
| (5) (−f2)/ft = | 0.0536 |
| (6) f3/ft = | 0.0939 |

Figure 7A:
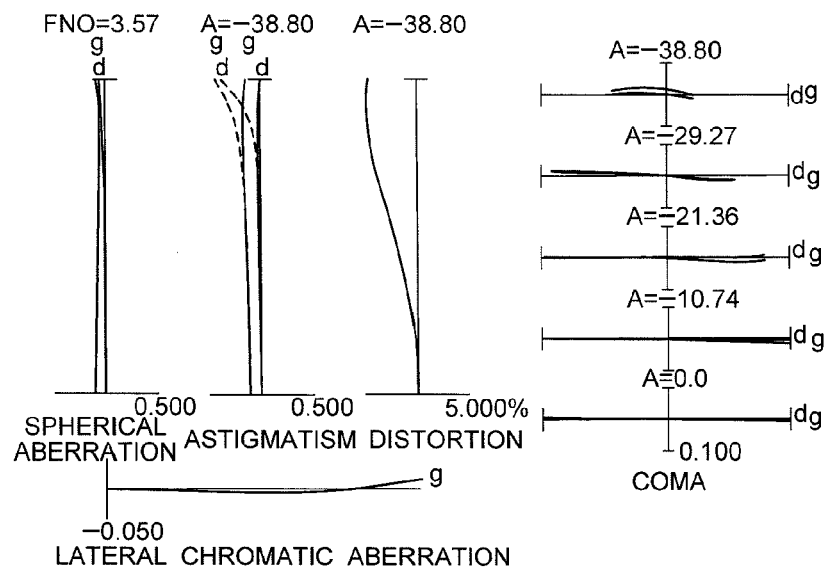
Figure 7B:
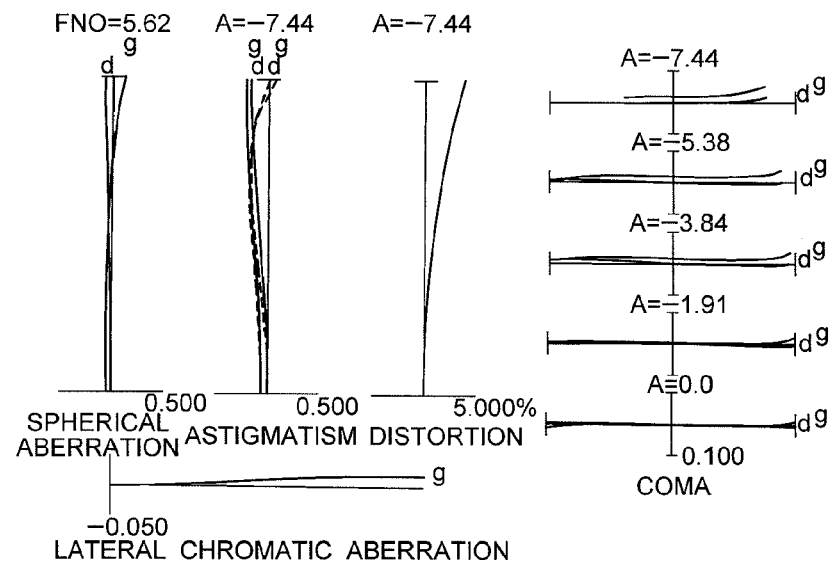
Figure 7C:
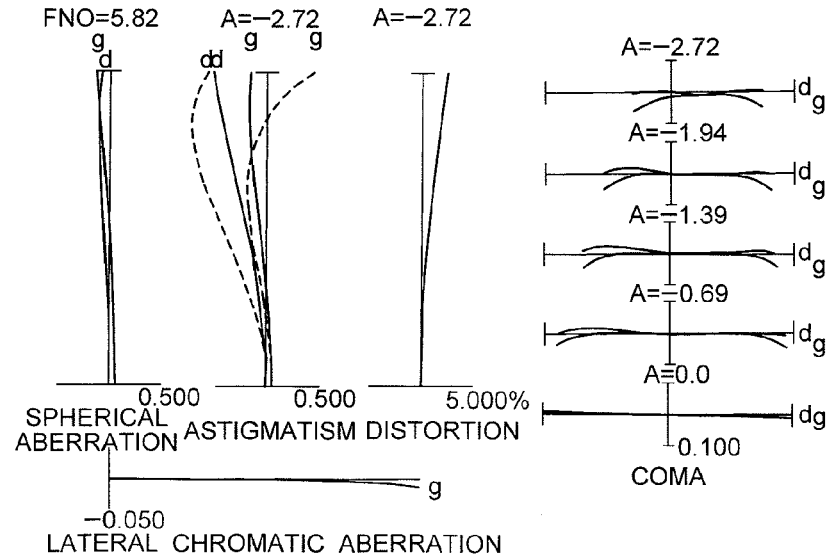

FIGS. 7A, 7B and 7C are graphs showing various aberrations of the zoom lens system according to Example 3 upon focusing on an infinitely distant object, in which FIG. 7A shows in a wide-angle end state, FIG. 7B shows in an intermediate focal length state, and FIG. 7C shows in a telephoto end state.

As is apparent from various graphs, the zoom lens system ZL3 according to Example 3 shows superb optical performance as a result of good corrections to various aberrations in each focal length state from the wide-angle end state through the telephoto end state.

Example 4

Figure 8:
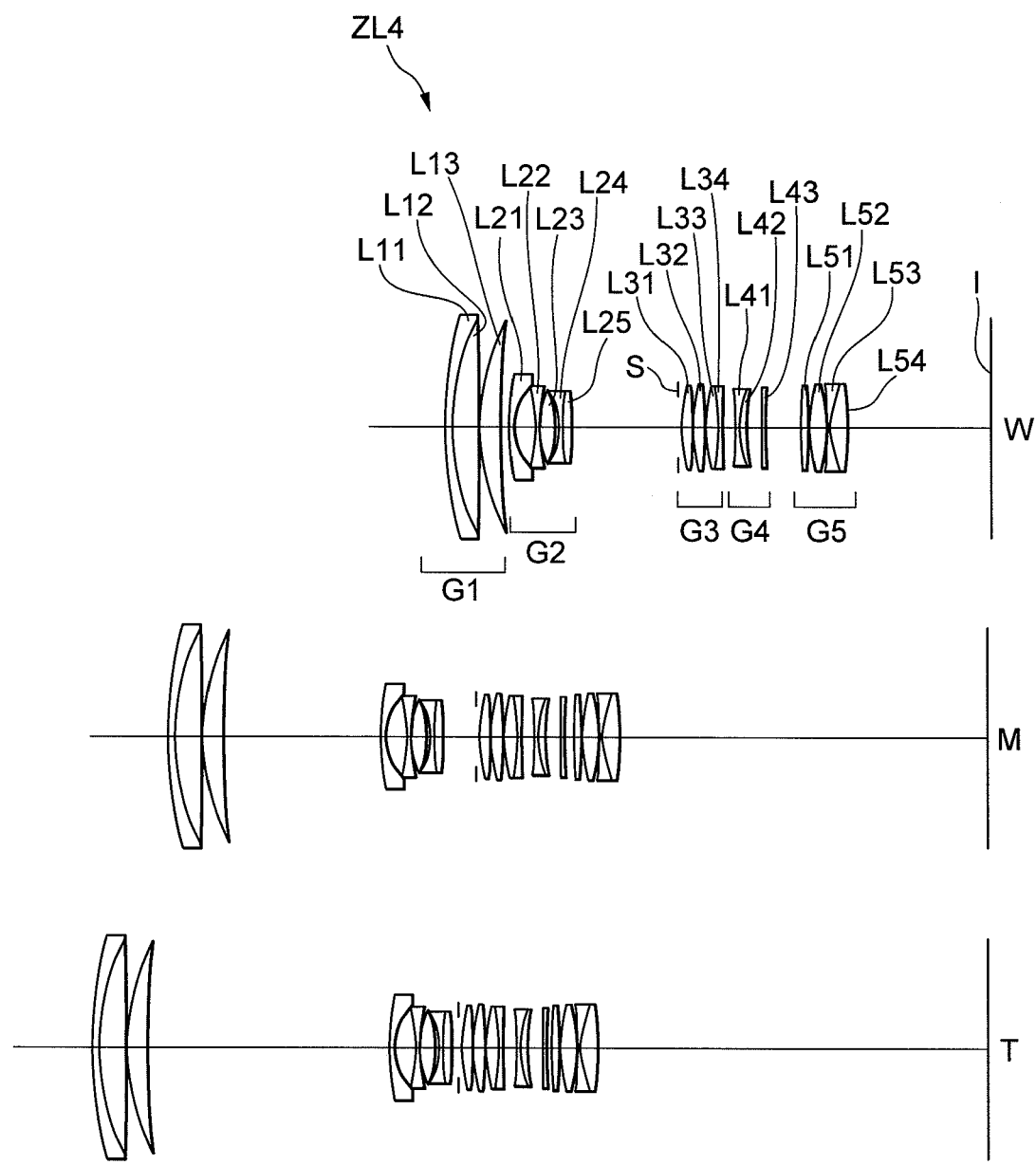
FIG. 8 is a sectional view showing a lens configuration of a zoom lens system according to Example 4 of the present invention.

FIG. 8 is a sectional view showing a lens configuration of a zoom lens system ZL4 according to Example 4 of the present invention.

As shown in FIG. 8, the zoom lens system ZL4 according to Example 4 of the present invention is composed of, in order from an object side along an optical axis, a first lens group G1 having positive refractive power, a second lens group G2 having negative refractive power, a third lens group G3 having positive refractive power, a fourth lens group G4 having negative refractive power, and a fifth lens group G5 having positive refractive power.

In the zoom lens system ZL4 according to Example 4, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases. Moreover, with respect to the image plane I, the first lens group G1 is moved monotonously to the object side, the second lens group G2 moves at first to the object side and then to the image side, and the third lens group G3, the fourth lens group G4, and the fifth lens group G5 move monotonously to the object side.

An aperture stop S is disposed to the most object side of the third lens group G3, which is disposed to the image side of the second lens group G2, and constructed integrally with the third lens group G3.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is applied with a resin layer on which an aspherical surface is formed.

The third lens group G3 is composed of, in order from the object side along the optical axis, a double convex positive lens L31, a double convex positive lens L32, and a cemented lens constructed by a double convex positive lens L33 cemented with a double concave negative lens L34.

The fourth lens group G4 is composed of, in order from the object side along the optical axis, a cemented lens constructed by a double concave negative lens L41 cemented with a positive meniscus lens L42 having a convex surface facing the object side, and a double concave negative lens L43. The double concave negative lens L41 disposed to the most object side of the fourth lens group G4 is a glass mold type aspherical lens whose object side lens surface is formed as an aspherical surface.

The fifth lens group G5 is composed of, in order from the object side along the optical axis, a double convex positive lens L51, a double convex positive lens L52, and a cemented lens constructed by a double concave negative lens L53 cemented with a double convex positive lens L54. The double convex positive lens L51 disposed to the most object side of the fifth lens group G5 is a glass mold type aspherical lens whose object side lens surface is formed as an aspherical surface. Light rays come out from the lens L54 form an image on the image plane I.

In the zoom lens system ZL4 seen from another point of view according to Example 4, an antireflection coating explained later is applied to the image side lens surface (surface number 8) of the negative meniscus lens L21 in the second lens group G2 and the object side lens surface (surface number 9) of the double concave negative lens L22 in the second lens group G2.

Various values associated with the zoom lens system ZL4 according to Example 4 are listed in Table 4.

TABLE 4

(Specifications)

|  | W | M | T |
|---|---|---|---|
| f = | 18.53990 | 104.99890 | 290.97220 |
| FNO = | 3.63 | 6.53 | 5.76 |
| 2ω = | 78.03 | 15.12 | 5.50 |
| Y = | 14.20 | 14.20 | 14.20 |
| TL = | 148.47975 | 223.45498 | 243.47962 |

TABLE 4-continued (Lens Surface Data)

| m | r | d | nd | vd |
|---|---|---|---|---|
| OP | ∞ | | | |
| 1) | 123.68736 | 2.00000 | 1.850260 | 32.35 |
| 2) | 64.01149 | 7.49242 | 1.497820 | 82.52 |
| 3) | −654.50843 | 0.10000 | | |
| 4) | 62.71606 | 5.56614 | 1.593190 | 67.87 |
| 5) | 338.21690 | (D5) | | |
| *6) | 86.10262 | 0.15000 | 1.553890 | 38.09 |
| 7) | 74.17416 | 1.00000 | 1.834807 | 42.72 |
| 8) | 14.60671 | 5.86842 | | |
| 9) | −35.84059 | 1.00000 | 1.816000 | 46.62 |
| 10) | 56.14027 | 0.10000 | | |
| 11) | 30.62237 | 4.14127 | 1.761820 | 26.56 |
| 12) | −34.27482 | 1.04557 | | |
| 13) | −21.10387 | 1.00000 | 1.816000 | 46.62 |
| 14) | 52.82811 | 2.37319 | 1.808090 | 22.79 |
| 15) | −175.58495 | (D15) | | |
| 16) | ∞ | 1.00000 | Aperture Stop S | |
| 17) | 47.13420 | 3.04638 | 1.593190 | 67.87 |
| 18) | −88.12740 | 0.10000 | | |
| 19) | 45.40089 | 2.99049 | 1.487490 | 70.41 |
| 20) | −120.66845 | 0.10000 | | |
| 21) | 34.57498 | 3.89524 | 1.487490 | 70.41 |
| 23) | 223.90298 | (D23) | | |
| *24) | −73.73632 | 1.00000 | 1.693501 | 53.20 |
| 25) | 28.67060 | 2.32916 | 1.761820 | 26.56 |
| 26) | 74.43881 | 3.83682 | | |
| 27) | −142.03529 | 1.00000 | 1.729157 | 54.66 |
| 28) | 611.00711 | (D28) | | |
| *29) | 180.26856 | 2.01608 | 1.589130 | 61.16 |
| 30) | −89.35755 | 0.10000 | | |
| 31) | 38.35930 | 4.60054 | 1.487490 | 70.41 |
| 32) | −37.06377 | 0.10000 | | |
| 33) | −77.14520 | 1.00000 | 1.882997 | 40.76 |
| 34) | 26.69112 | 4.67728 | 1.548141 | 45.79 |
| 35) | −63.34628 | (BF) | | |
| I | ∞ | | | |

(Aspherical Surface Data)

Surface Number: 6

| κ = | 1.0000 |
|---|---|
| A4 = | 8.23380E−06 |
| A6 = | −7.61930E−09 |
| A8 = | −1.62910E−11 |
| A10 = | 3.10500E−13 |

Surface Number: 24

| κ = | 1.0000 |
|---|---|
| A4 = | 2.55060E−06 |
| A6 = | 8.47220E−09 |
| A8 = | 0.00000E+00 |
| A10 = | 0.00000E+00 |

Surface Number: 29

| κ = | 1.0000 |
|---|---|
| A4 = | −1.75960E−05 |
| A6 = | 2.57870E−09 |
| A8 = | −1.64390E−10 |
| A10 = | 4.18260E−13 |

(Variable Distances)

| | W | M | T |
|---|---|---|---|
| f = | 18.53990 | 104.99890 | 290.97220 |
| D5 = | 2.10000 | 42.81506 | 66.17464 |
| D15 = | 29.13697 | 9.15693 | 2.00000 |
| D23 = | 3.71917 | 3.41648 | 2.87636 |
| D28 = | 9.89485 | 2.31118 | 1.50000 |
| BF = | 38.99975 | 101.12632 | 106.29961 |
| φ = | 16.40 | 16.40 | 19.40 |

(Lens Group Data)

| Group | ST | focal length |
|---|---|---|
| G1 | 1 | 101.82826 |
| G2 | 6 | −12.57853 |
| G3 | 16 | 26.11926 |
| G4 | 24 | −41.23076 |
| G5 | 29 | 49.44213 |

(Values for Conditional Expressions)

| (1) f1/(−f2) = | 8.095 |
|---|---|
| (2) f3/(−f4) = | 0.633 |
| (3) f1/fw = | 5.492 |
| (4) f1/ft = | 0.350 |
| (5) (−f2)/ft = | 0.0432 |
| (6) f3/ft = | 0.0898 |

Figure 9A:
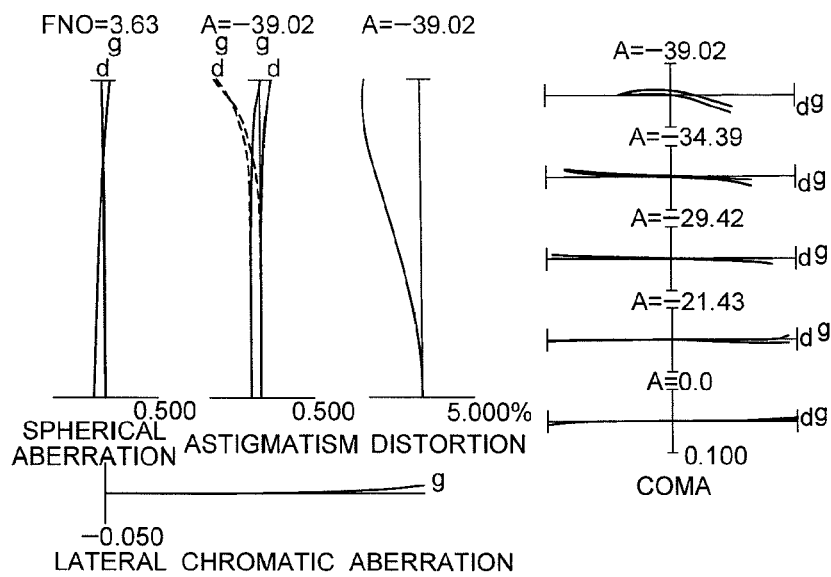
Figure 9B:
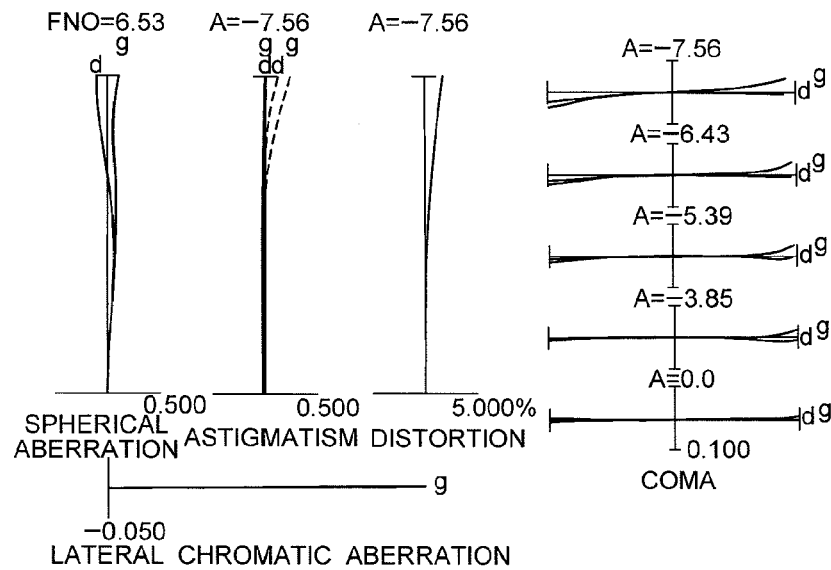
Figure 9C:
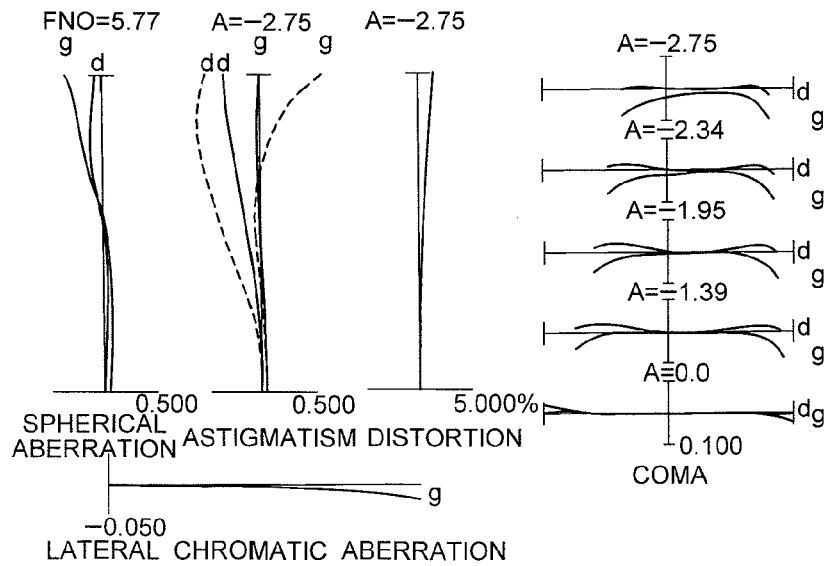

FIGS. 9A, 9B and 9C are graphs showing various aberrations of the zoom lens system according to Example 4 upon focusing on an infinitely distant object, in which FIG. 9A shows in a wide-angle end state, FIG. 9B shows in an intermediate focal length state, and FIG. 9C shows in a telephoto end state.

As is apparent from various graphs, the zoom lens system ZL4 according to Example 4 shows superb optical performance as a result of good corrections to various aberrations in each focal length state from the wide-angle end state through the telephoto end state.

Example 5

Figure 10:
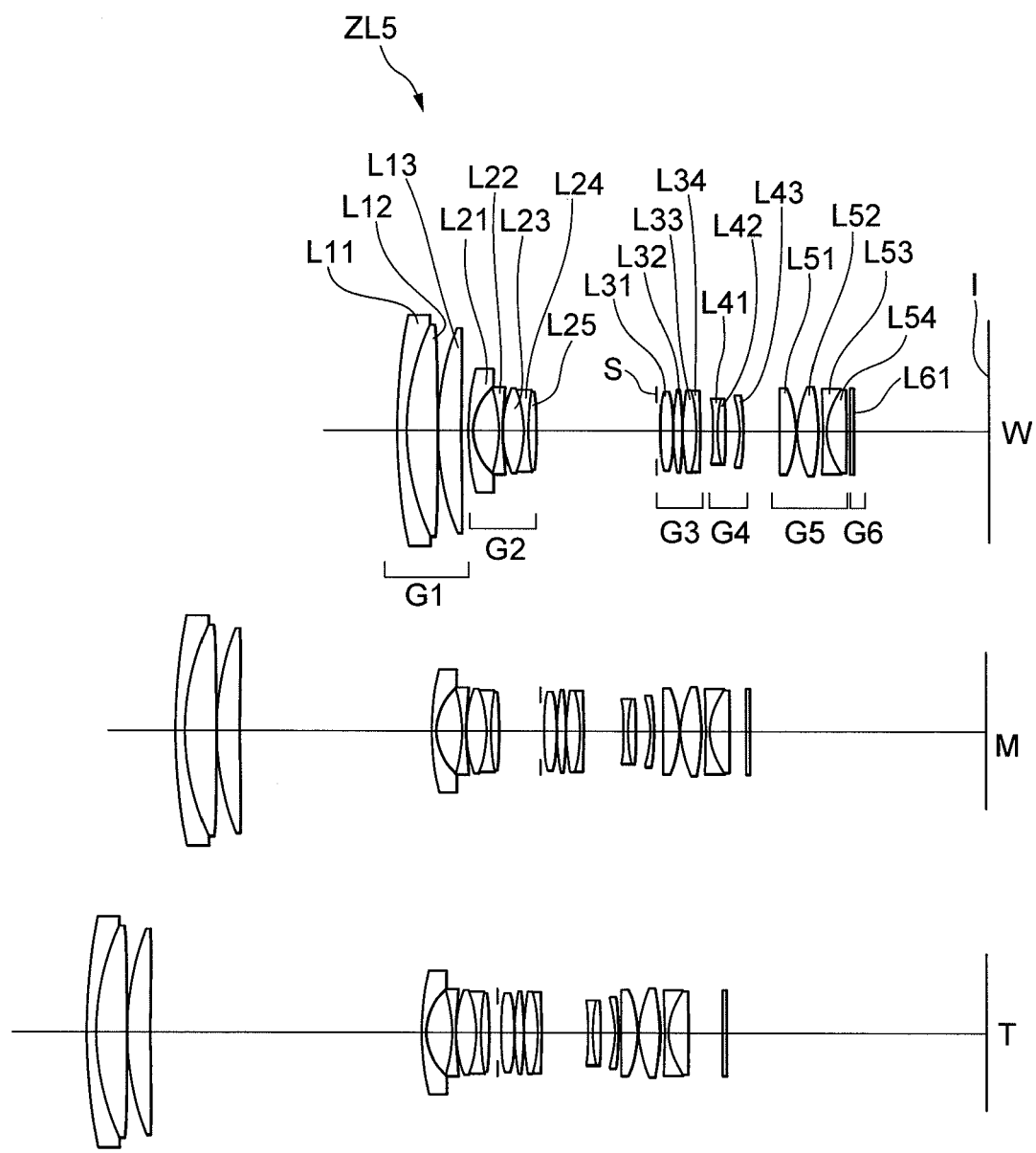
FIG. 10 is a sectional view showing a lens configuration of a zoom lens system according to Example 5 of the present invention.

FIG. 10 is a sectional view showing a lens configuration of a zoom lens system ZL5 according to Example 5 of the present invention.

As shown in FIG. 10, the zoom lens system ZL5 according to Example 5 of the present invention is composed of, in order from an object side along an optical axis, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power.

In the zoom lens system ZL5 according to Example 5, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, a distance between the fourth lens group G4 and the fifth lens group G5 decreases, and a distance between the fifth lens group G5 and the sixth lens group G6 increases. Moreover, with respect to the image plane I, the first lens group G1 is moved monotonously to the object side, the second lens group G2 to the object side, and the third lens group G3, the fourth lens group G4, the fifth lens group G5, and the sixth lens group G6 monotonously to the object side.

An aperture stop S is disposed to the most object side of the third lens group G3, which is disposed to the image side of the second lens group G2, and constructed integrally with the third lens group G3.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is applied with a resin layer on which an aspherical surface is formed.

The third lens group G3 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The fourth lens group G4 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the fourth lens group G4 is a compound type aspherical lens whose object side lens surface is applied with a resin layer on which an aspherical surface is formed.

The fifth lens group G5 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the fifth lens group G5 is a glass mold type aspherical lens whose object side lens surface is formed as an aspherical surface.

The sixth lens group G6 is composed of a negative meniscus lens L61 having a concave surface facing the object side. Light rays come out from the lens L61 form an image on the image plane I.

In the zoom lens system ZL5 seen from another point of view according to Example 5, an antireflection coating explained later is applied to the image side lens surface (surface number 5) of the positive meniscus lens L13 in the first lens group G1 and the object side lens surface (surface number 13) of the double concave negative lens L24 in the second lens group G2.

Various values associated with the zoom lens system ZL5 according to Example 5 are listed in Table 5.

TABLE 5

(Specifications)

|  | W | M | T |
|---|---|---|---|
| f = | 18.54304 | 104.53686 | 291.20646 |
| FNO = | 3.62 | 5.69 | 5.89 |
| 2ω = | 77.71 | 14.84 | 5.42 |
| Y = | 14.20 | 14.20 | 14.20 |
| TL = | 165.55254 | 226.22585 | 251.75712 |

(Lens Surface Data)

| m | r | d | nd | vd |
|---|---|---|---|---|
| OP | ∞ | | | |
| 1) | 183.81280 | 2.20000 | 1.834000 | 37.16 |
| 2) | 68.69030 | 8.80000 | 1.497820 | 82.52 |
| 3) | −504.73840 | 0.10000 | | |
| 4) | 73.06060 | 6.45000 | 1.593190 | 67.87 |
| 5) | 2000.32320 | (D5) | | |
| *6) | 84.76870 | 0.10000 | 1.553890 | 38.09 |
| 7) | 73.93750 | 1.20000 | 1.834807 | 42.72 |
| 8) | 17.06200 | 6.95000 | | |
| 9) | −37.93160 | 1.00000 | 1.816000 | 46.62 |
| 10) | 77.23180 | 0.15000 | | |
| 11) | 36.29670 | 5.30000 | 1.784723 | 25.68 |
| 12) | −36.29670 | 0.80000 | | |
| 13) | −25.70960 | 1.00000 | 1.816000 | 46.62 |
| 14) | 66.95460 | 2.05000 | 1.808090 | 22.79 |
| 15) | −589.98310 | (D15) | | |
| 16) | ∞ | 1.00000 | Aperture Stop S | |
| 17) | 67.92220 | 3.40000 | 1.593190 | 67.87 |
| 18) | −48.85560 | 0.10000 | | |
| 19) | 69.84590 | 2.45000 | 1.487490 | 70.41 |
| 20) | −136.55010 | 0.10000 | | |
| 21) | 47.36510 | 4.20000 | 1.487490 | 70.41 |
| 22) | −36.08960 | 1.00000 | 1.808090 | 22.79 |
| 23) | −200.73470 | (D23) | | |
| *24) | −53.53560 | 0.20000 | 1.553890 | 38.09 |
| 25) | −55.64520 | 0.90000 | 1.696797 | 55.52 |
| 26) | 28.77750 | 2.15000 | 1.728250 | 28.46 |
| 27) | 94.20020 | 4.31840 | | |
| 28) | −27.43210 | 1.00000 | 1.729157 | 54.66 |
| 29) | −77.96130 | (D29) | | |
| 30) | −362.45900 | 4.65000 | 1.589130 | 61.18 |
| 31) | −24.87170 | 0.10000 | | |
| 32) | 31.18750 | 5.85000 | 1.487490 | 70.41 |
| 33) | −43.35070 | 1.45000 | | |
| 34) | −109.50450 | 1.00000 | 1.882997 | 40.76 |
| 35) | 20.35760 | 5.30000 | 1.548141 | 45.79 |
| 36) | −592.95680 | (D36) | | |
| 37) | −685.03610 | 1.20000 | 1.487490 | 70.41 |
| 38) | −1867.91160 | (BF) | | |
| I | ∞ | | | |

(Aspherical Surface Data)

Surface Number: 6

| κ = | 1.0000 |
| A4 = | 3.14000E−06 |
| A6 = | 5.15000E−10 |
| A8 = | −3.39000E−11 |
| A10 = | 1.15000E−13 |

Surface Number: 24

| κ = | 1.0000 |
| A4 = | 5.16000E−06 |
| A6 = | −1.44000E−09 |
| A8 = | 0.00000E+00 |
| A10 = | 0.00000E+00 |

Surface Number: 30

| κ = | 1.0000 |
| A4 = | −1.53000E−05 |
| A6 = | 9.53000E−10 |
| A8 = | 1.81000E−11 |
| A10 = | −2.21000E−13 |

(Variable Distances)

|  | W | M | T |
|---|---|---|---|
| f = | 18.54304 | 104.53686 | 291.20646 |
| D5 = | 2.15700 | 53.00860 | 76.40530 |
| D15 = | 33.96250 | 11.43850 | 2.00000 |
| D23 = | 3.47700 | 11.57560 | 13.01220 |
| D29 = | 10.53510 | 2.43660 | 1.00000 |
| D36 = | 1.00000 | 5.00490 | 10.10370 |
| BF = | 37.95254 | 66.29325 | 72.76752 |
| φ = | 15.80 | 17.50 | 19.60 |

(Lens Group Data)

| Group | ST | focal length |
|---|---|---|
| G1 | 1 | 118.23472 |
| G2 | 6 | −15.62566 |
| G3 | 16 | 27.50442 |

TABLE 5-continued

| G4 | 24 | −25.94244 |
|---|---|---|
| G5 | 30 | 34.27114 |
| G6 | 37 | −2219.77745 |

| (Values for Conditional Expressions) | |
|---|---|
| (1) f1/(−f2) = | 7.567 |
| (2) f3/(−f4) = | 1.060 |
| (3) f1/fw = | 6.376 |
| (4) f1/ft = | 0.406 |
| (5) (−f2)/ft = | 00.0537 |
| (6) f3/ft = | 0.0944 |

Figure 11A:
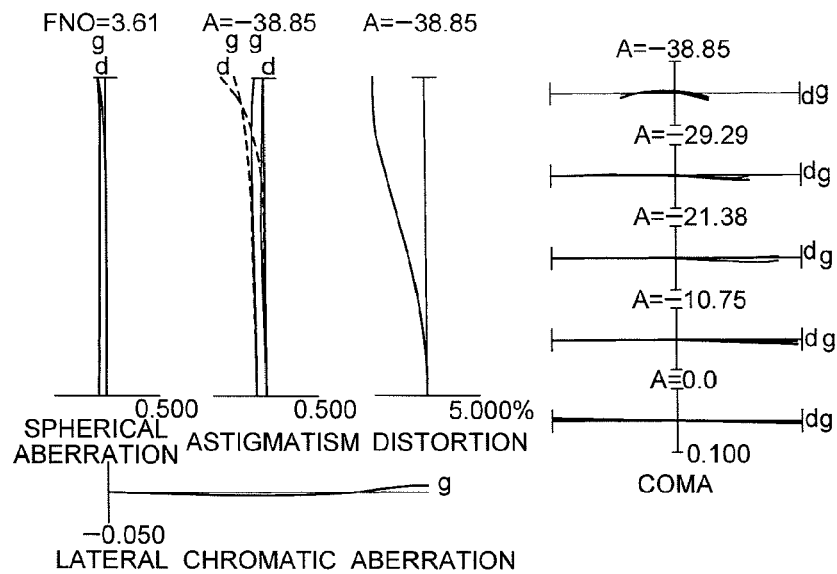
Figure 11B:
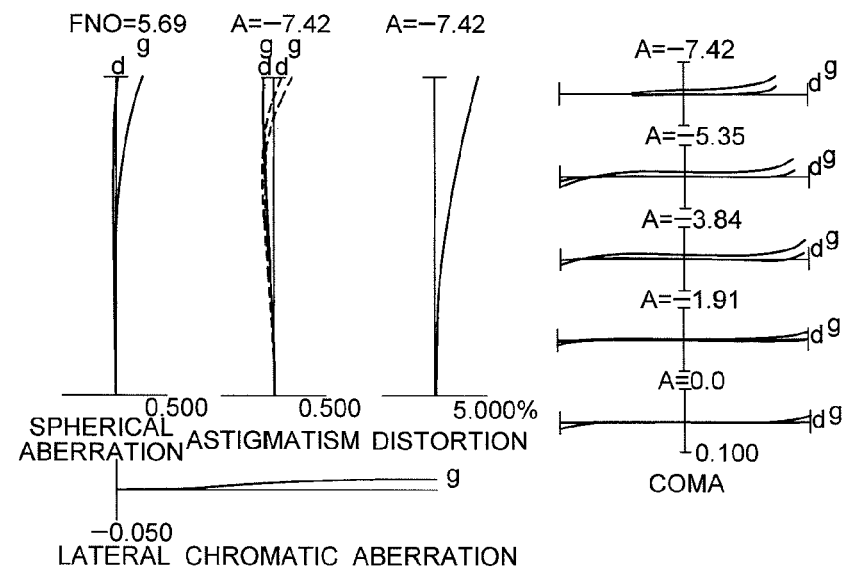
Figure 11C:
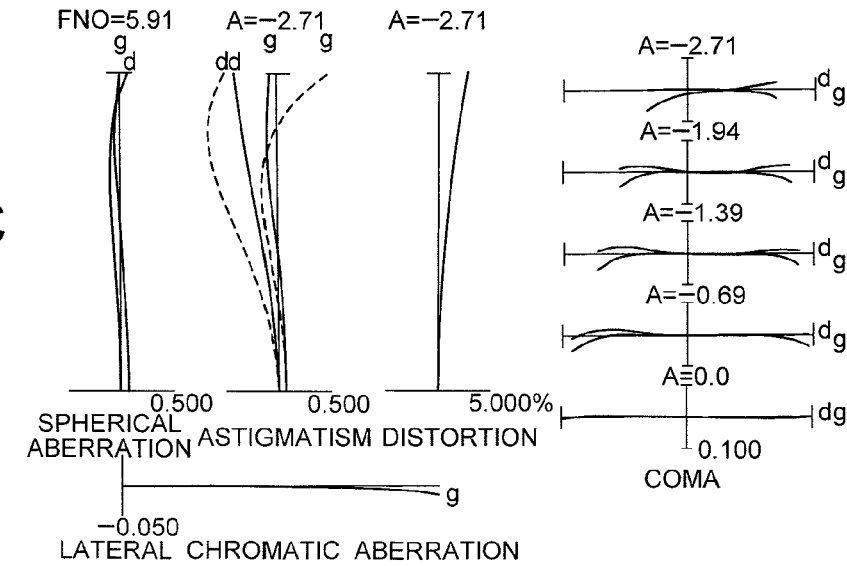

FIGS. 11A, 11B and 11C are graphs showing various aberrations of the zoom lens system according to Example 5 upon focusing on an infinitely distant object, in which FIG. 11A shows in a wide-angle end state, FIG. 11B shows in an intermediate focal length state, and FIG. 11C shows in a telephoto end state.

As is apparent from various graphs, the zoom lens system ZL5 according to Example 5 shows superb optical performance as a result of good corrections to various aberrations in each focal length state from the wide-angle end state through the telephoto end state.

Figure 15:
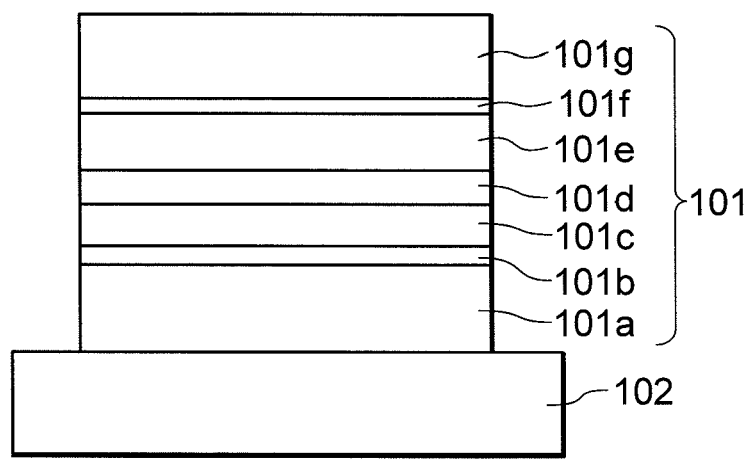
FIG. 15 is an explanatory view showing a configuration of an antireflection coating according to the present application.

Then, an antireflection coating (which is also referred to as a multilayer broadband antireflection coating) used in the zoom lens systems seen from another point of view according to the present application is explained. FIG. 15 is an explanatory view showing a configuration of an antireflection coating used in the zoom lens according to the present embodiment. The antireflection coating 101 is composed of seven layers and is formed on an optical surface of an optical member 102 such as a lens. A first layer 101a is formed with aluminum oxide by means of a vacuum evaporation method. On the first layer 101a, a second layer 101b formed with mixture of titanium oxide and zirconium oxide by means of a vacuum evaporation method is formed. Moreover, on the second layer 101b, a third layer 101c formed with aluminum oxide by means of vacuum evaporation method is formed. Moreover, on the third layer 101c, a fourth layer 101d formed with a mixture of titanium oxide and zirconium oxide by means of a vacuum evaporation method is formed. Furthermore, on the fourth layer 101d, a fifth layer 101e formed with aluminum oxide by means of vacuum evaporation method is formed. On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating 101 according to the present embodiment. In order to form the seventh layer 101g, a sol-gel process, which is a kind of wet process, is used. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Incidentally, the wet process may involve using, without being limited to the sol-gel process, a process of acquiring a solid-state film through none of the gel state.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. At first, an aluminum oxide layer, which becomes a first layer 101a, a mixture of titanium oxide and zirconium oxide layer, which becomes a second layer 101b, an aluminum oxide layer, which becomes a third layer 101c, a mixture of titanium oxide and zirconium oxide layer, which becomes a fourth layer 101d, an aluminum oxide layer, which becomes a fifth layer 101e, and a mixture of titanium oxide and zirconium oxide layer, which becomes a sixth layer 101f are formed on a film-forming surface (the above-mentioned optical surface of the optical member 102) in this order by a vacuum evaporation equipment. Then, after being took out from the vacuum evaporation equipment, the optical member 102 is applied with a sol liquid prepared by the hydrofluoric acid/magnesium acetate method added by silicon-alkoxide by means of a spin coat method, so that a layer formed by a mixture of silica and magnesium fluoride, which becomes a seventh layer 101g, is formed. A reaction formula prepared by the hydrofluoric acid/magnesium acetate method is shown by expression (a):

$$2HF+Mg(CH3COO)2 \rightarrow MgF2+2CH3COOH \quad (a).$$

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With using such a sol gel method, particles of several nanometers to several tens of nanometers are piled up with air gaps in between to form the seventh layer 101g.

Optical performance of the optical member including the thus-formed antireflection coating 101 will hereinafter be described by using spectral characteristics shown in FIG. 16.

The optical member (lens) including the antireflection coating according to the present embodiment is formed under the conditions shown in the following Table 6. Herein, the Table 6 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 6 shows Al2O3 expressed as the aluminum oxide, ZrO2+TiO2 expressed as the mixture of titanium oxide and zirconium oxide and MgF2+SiO2 expressed as the mixture of magnesium fluoride and silica.

TABLE 6

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate): | | 1.62 | 1.74 | 1.85 |

Figure 16:
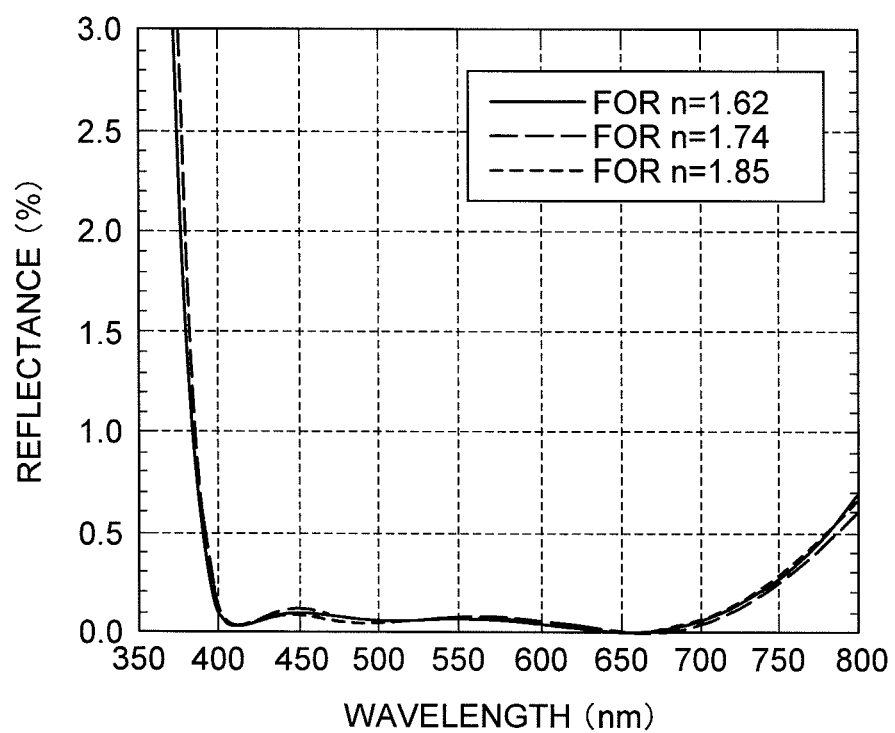
FIG. 16 is a graph showing spectral reflectance of an antireflection coating according to the present embodiment.

FIG. 16 shows the spectral characteristics when the light beams are vertically incident on the optical member in which the optical film thickness of each of the layers of the antireflection coating 101 is designed, with the reference wavelength λ set to 550 nm in Table 6.

It is understood from FIG. 16 that the optical member including the antireflection coating 101 designed with the reference wavelength λ set to 550 nm can restrain the reflectance down to 0.2% or less over the entire range in which the wavelengths of the light beams are 420 nm through 720 nm. Further, in Table 6, even the optical member including the antireflection coating 101, in which each optical film thickness is designed with the reference wavelength λ set to d-line (wavelength 587.6 nm), has substantially the same spectral characteristics as in the case where the reference wavelength λ shown in FIG. 16 is 550 nm in a way that affects substantially none of the spectral characteristics thereof.

Then, a modified example of the antireflection coating will be explained. The antireflection coating is a 5-layered film, and, similarly to Table 6, the optical film thickness of each layer with respect to the reference wavelength λ is designed under conditions shown in the following Table 7. In this modified example, the formation of the fifth layer involves using the sol-gel process described above.

TABLE 7

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate): | | 1.46 | 1.52 |

Figure 17:
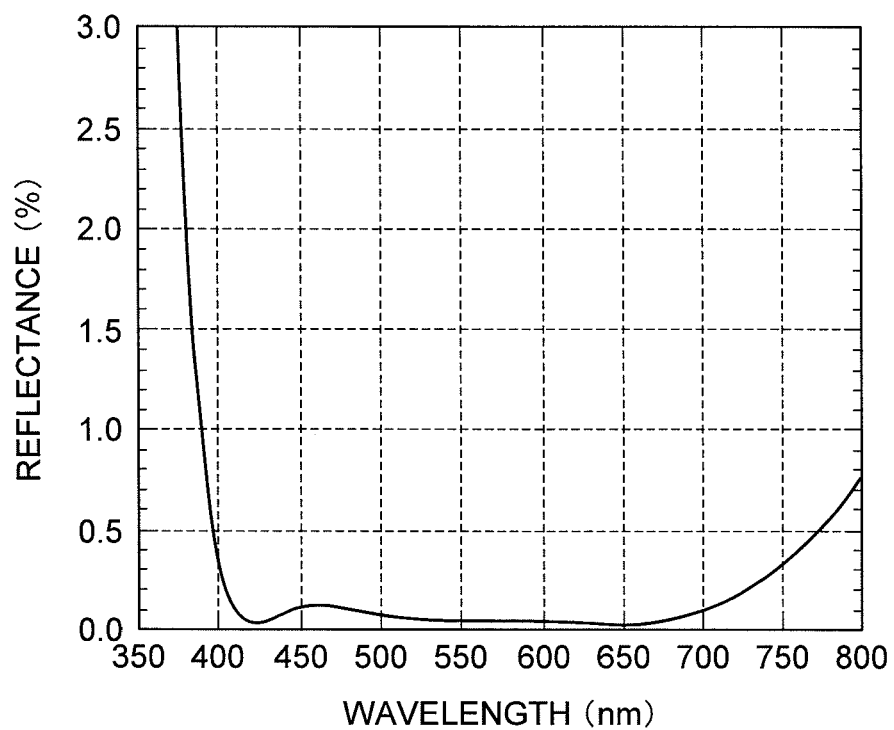
FIG. 17 is a graph showing spectral reflectance of an antireflection coating according to a variation of the present invention.

FIG. 17 shows the spectral characteristics when the light beams are vertically incident on the optical member in which the optical film thickness of each of the layers is designed, with the substrate refractive index set to 1.52 and the reference wavelength λ set to 550 nm in Table 7. It is understood from FIG. 17 that the antireflection coating in the modified example can restrain the reflectance down to 0.2% or less over the entire range in which the wavelengths of the light beams are 420 nm-720 nm. Note that in the Table 7, even the optical member including the antireflection coating, in which each optical film thickness is designed with the reference wavelength λ set to d-line (wavelength 587.6 nm), has substantially the same spectral characteristics as the spectral characteristics shown in FIG. 17 in a way that affects substantially none of the spectral characteristics thereof.

Figure 18:
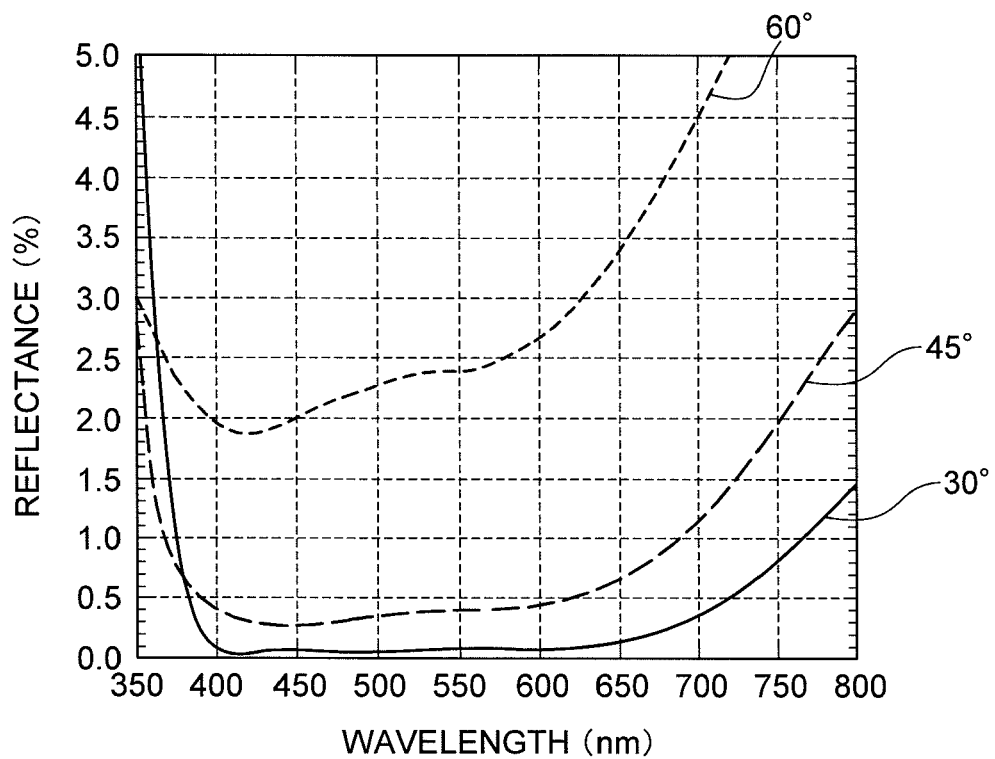
FIG. 18 is a graph showing incident angle dependency of spectral reflectance of the antireflection coating according to the variation.

FIG. 18 shows the spectral characteristics in such a case that the incident angles of the light beams upon the optical member having the spectral characteristics shown in FIG. 17 are 30 degrees, 45 degrees and 60 degrees, respectively. Note that FIGS. 17 and 18 do not illustrate the spectral characteristics of the optical member including the antireflection coating in which the substrate refractive index is 1.46 shown in Table 7, however, it is understood that the optical member has substantially the same spectral characteristics such as the substrate refractive index being 1.52.

Figure 19:
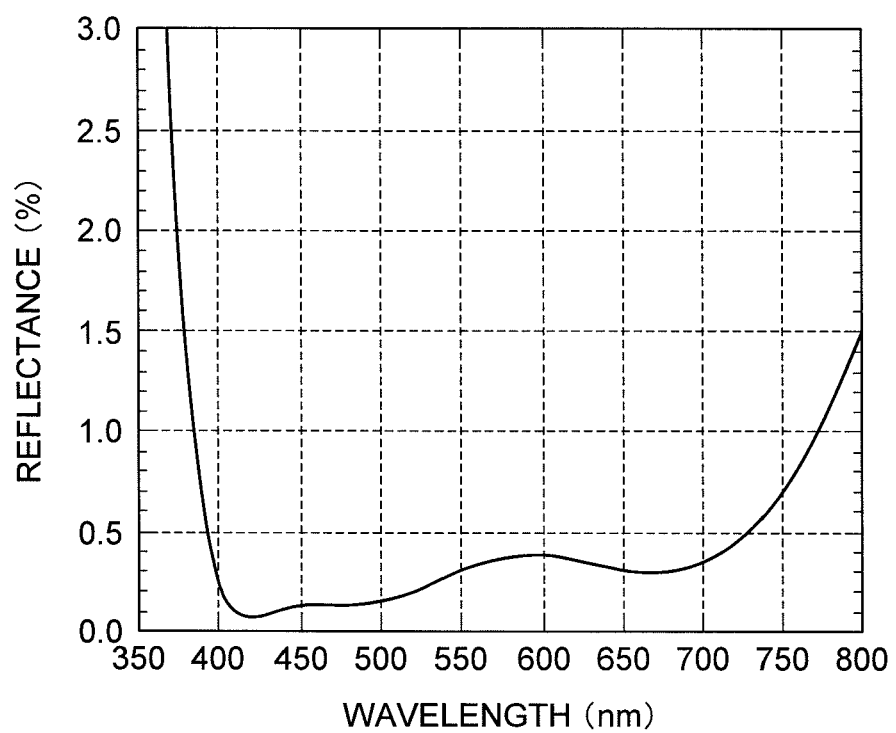
FIG. 19 is a graph showing spectral reflectance of an antireflection coating according to a conventional example.

Furthermore, FIG. 19 shows one example of the antireflection coating formed by only the dry process such as the conventional vacuum evaporation method by way of a comparison. FIG. 19 shows the spectral characteristics when the light beams are vertically incident on the optical member in which to design the antireflection coating structured under the conditions shown in the following Table 8, with the substrate refractive index set to 1.52 in the same way as in the Table 7. Moreover, FIG. 20 shows the spectral characteristics in such a case that the incident angles of the light beams upon the optical member having the spectral characteristics shown in FIG. 19 are 30 degrees, 45 degrees and 60 degrees, respectively.

TABLE 8

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| | refractive index of substrate | | 1.52 |

Figure 20:
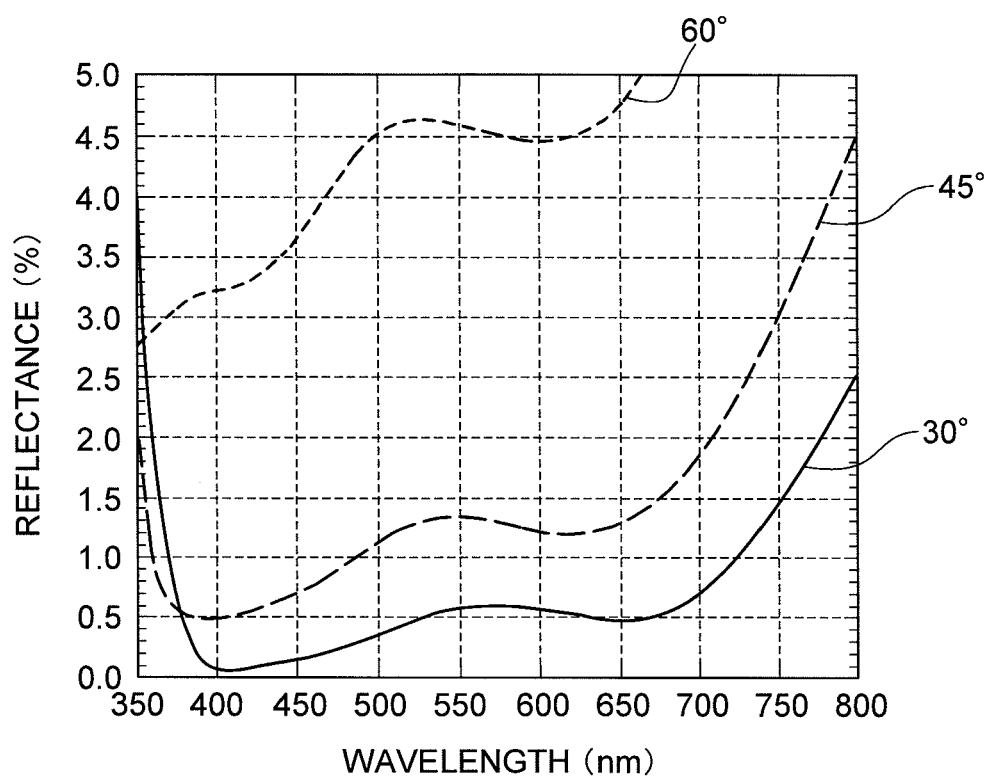
FIG. 20 is a graph showing incident angle dependency of spectral reflectance of the antireflection coating according to the conventional example.

To compare the spectral characteristics of the optical member including the antireflection coating according to the present embodiment illustrated in FIGS. 16 through 18 with the spectral characteristics in the conventional examples shown in FIGS. 19 and 20, it is well understood that the present antireflection coating has the much lower reflectance at any incident angles and, besides, has the lower reflectance in the broader band.

Then, an example of applying the antireflection coating shown in the Tables 6 and 7 to Examples 1 through Example 5 of the present application discussed above is explained.

In the zoom lens system ZL1 seen from another point of view according to Example 1, as shown in the Table 1, the refractive index of the negative meniscus lens L21 of the second lens group G2 is nd=1.834807, and the refractive index of the double concave negative lens L22 of the second lens group G2 is nd=1.816000, whereby it is feasible to reduce the reflected light from each lens surface and to reduce ghost images and flare as well by applying the antireflection coating 101 (see Table 6) corresponding to 1.85 as the substrate refractive index to the image side lens surface of the negative meniscus lens L21 and applying the antireflection coating (see Table 6) corresponding to 1.85 as the substrate refractive index to the object side lens surface of the double concave negative lens L22.

In the zoom lens system ZL2 seen from another point of view according to Example 2, as shown in the Table 2, the refractive index of the positive meniscus lens L13 of the first lens group G1 is nd=1.593190, and the refractive index of the double convex positive lens L23 of the second lens group G2 is nd=1.784720, whereby it is feasible to reduce the reflected light from each lens surface and to reduce ghost images and flare as well by applying the antireflection coating 101 (see Table 6) corresponding to 1.62 as the substrate refractive index to the object side lens surface of the positive meniscus lens L13 and applying the antireflection coating (see Table 6) corresponding to 1.74 as the substrate refractive index to the image side lens surface of the double convex positive lens L23.

In the zoom lens system ZL3 seen from another point of view according to Example 3, as shown in the Table 3, the refractive index of the double convex positive lens L12 of the first lens group G1 is nd=1.497820, and the refractive index of the double convex positive lens L23 of the second lens group G2 is nd=1.784723, whereby it is feasible to reduce the reflected light from each lens surface and to reduce ghost images and flare as well by applying the antireflection coating 101 (see Table 7) corresponding to 1.52 as the substrate refractive index to the image side lens surface of the double convex positive lens L12 and applying the antireflection coating (see Table 6) corresponding to 1.74 as the substrate refractive index to the image side lens surface of the double convex positive lens L23.

In the zoom lens system ZL4 seen from another point of view according to Example 4, as shown in the Table 4, the refractive index of the negative meniscus lens L21 of the second lens group G2 is nd=1.834807, and the refractive index of the double concave negative lens L22 of the second lens group G2 is nd=1.816000, whereby it is feasible to reduce the reflected light from each lens surface and to reduce ghost images and flare as well by applying the antireflection coating 101 (see Table 6) corresponding to 1.85 as the substrate refractive index to the image side lens surface of the negative meniscus lens L21 and applying the antireflection coating (see Table 6) corresponding to 1.85 as the substrate refractive index to the object side lens surface of the double concave negative lens L22.

In the zoom lens system ZL5 seen from another point of view according to Example 5, as shown in the Table 5, the refractive index of the positive meniscus lens L13 of the first lens group G1 is nd=1.593190, and the refractive index of the double concave negative lens L24 of the second lens group G2 is nd=1.816000, whereby it is feasible to reduce the reflected light from each lens surface and to reduce ghost images and flare as well by applying the antireflection coating 101 (see Table 6) corresponding to 1.62 as the substrate refractive index to the image side lens surface of the positive meniscus lens L13 and applying the antireflection coating (see Table 6) corresponding to 1.85 as the substrate refractive index to the object side lens surface of the double concave negative lens L24.

As described above, each example of the present application makes it possible to realize a zoom lens system having high optical performance.

The above-described Examples of the present application only show a specific example for the purpose of better understanding of the present application. Accordingly, it is needless to say that the present application in its broader aspect is not limited to the specific details and representative devices. Incidentally, the following description may suitably be applied within limits that do not deteriorate optical performance.

Although zoom lens systems having a five-lens-group configuration or a six-lens-group configuration have been shown as an example of the zoom lens system according to the present invention, the present invention can be applied to other lens configurations such as a seven-lens-group configuration, and the like. Specifically, a lens configuration in which a lens or a lens group is added to the most object side, or the most image side of the zoom lens system is possible. Incidentally, a lens group is defined as a portion including at least one lens separated by air spaces.

In a zoom lens system according to the present invention, in order to vary focusing from infinitely distant object to a close object, a portion of a lens group, a single lens group, or a plurality of lens groups may be moved along the optical axis as a focusing lens group. The focusing lens group can be used for auto focus, and suitable for being driven by a motor such as an ultrasonic motor. It is particularly preferable that at least a portion of the second lens group is moved as the focusing lens group.

Moreover, in a zoom lens system according to the present invention, a lens group or a portion of a lens group may be moved as a vibration reduction lens group in a direction including a component perpendicular to the optical axis, or tilted (swayed) in a direction including the optical axis thereby correcting an image blur caused by a camera shake. In particular, at least a portion of the fourth lens group is preferably made as the vibration reduction lens group.

In a zoom lens system according to the present invention, any lens surface may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. Any lens surface may be a diffractive optical surface, and any lens may be a graded-index type lens (GRIN lens) or a plastic lens.

In a zoom lens system according to the present invention, although an aperture stop S is preferably disposed in the vicinity of the third lens group, the function may be substituted by a lens frame without disposing a member as an aperture stop.

Figure 12:
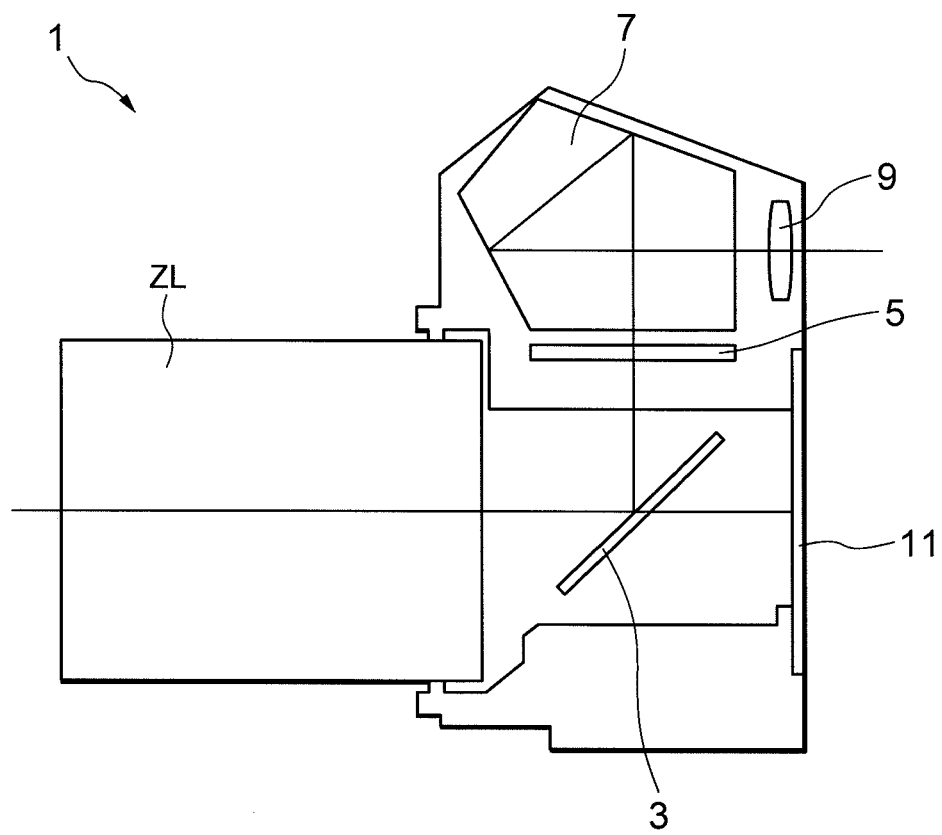
FIG. 12 is a diagram showing a construction of a single-lens reflex digital camera equipped with the optical system according to Example 1 of the present invention.

Then, an optical apparatus equipped with the zoom lens system ZL according to the present invention is explained. FIG. 12 is a sectional view schematically showing a single-lens reflex digital camera equipped with the zoom lens system according to the present invention.

In the single-lens reflex digital camera 1 shown in FIG. 12, light rays emitted from an unillustrated object (an object to be shot) are converged by the zoom lens system ZL, and focused on a focusing screen 5 through a quick return mirror 3. The light rays focused on the focusing screen 5 are reflected a plurality of times in a pentagonal roof prism 7, and led to an eyepiece 9. Accordingly, a photographer can observe the object image (the object to be shot) as an erected image through the eyepiece 9.

When the photographer presses an unillustrated release button all the way down, the quick return mirror 3 is retracted from the optical path, the light rays from the unillustrated object (the object to be shot) converged by the zoom lens system ZL are formed an object image on an imaging device 11. Accordingly, the light rays emitted from the object are captured by the imaging device 11, and stored in an unillustrated memory as a photographed image of the object. In this manner, the photographer can take a picture of an object by the camera 1.

As described above, the single-lens reflex digital camera 1 equipped with the zoom lens system ZL makes it possible to realize excellent optical performance with excellently correcting various aberrations. Incidentally, the camera 1 shown in FIG. 12 may be a one holding the imaging lens detachable manner or a one formed integrally with the imaging lens. Moreover, the camera may be a single-lens reflex camera or a camera including none of the quick return mirror.

Then, an outline of a method for manufacturing a zoom lens system ZL according to the present invention is explained.

Figure 13:
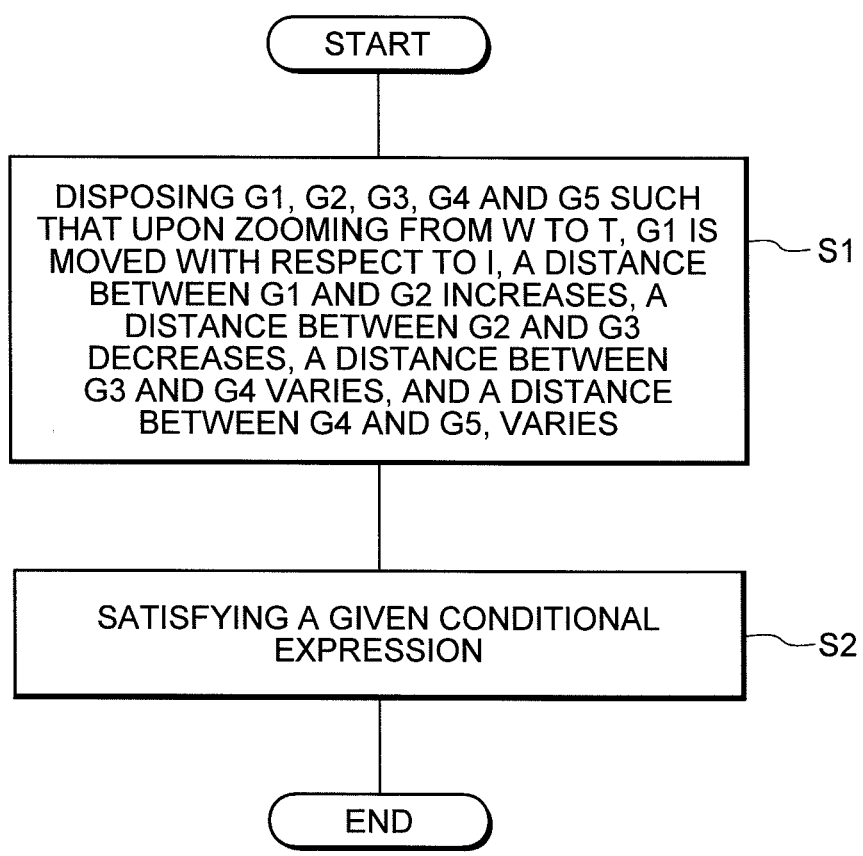
FIG. 13 is a flowchart schematically explaining a method for manufacturing the zoom lens system according to the present invention.

FIG. 13 is a flowchart schematically explaining a method for manufacturing the zoom lens system ZL according to the present application.

The method for manufacturing the zoom lens ZL system according to the present invention is a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising the following steps S1 and S2 shown in FIG. 13.

Step S1: disposing the first lens group, the second lens group, the third lens group, the fourth lens group and the fifth lens group such that upon zooming from a wide-angle end state to a telephoto end state, the first lens group is moved with respect to the image plane, a distance between the first lens group and the second lens group increases, a distance between the second lens group and the third lens group decreases, a distance between the third lens group and the fourth lens group varies, and a distance between the fourth lens group and the fifth lens group varies; and Step S2: satisfying the following conditional expression (1):

$$6.500<f1/(-f2)<10.000 \qquad (1)$$

where f1 denotes a focal length of the first lens group, and f2 denotes a focal length of the second lens group.

With this method for manufacturing a zoom lens system according to the present invention, it becomes possible to manufacture a zoom lens system having high optical performance.

Figure 14:
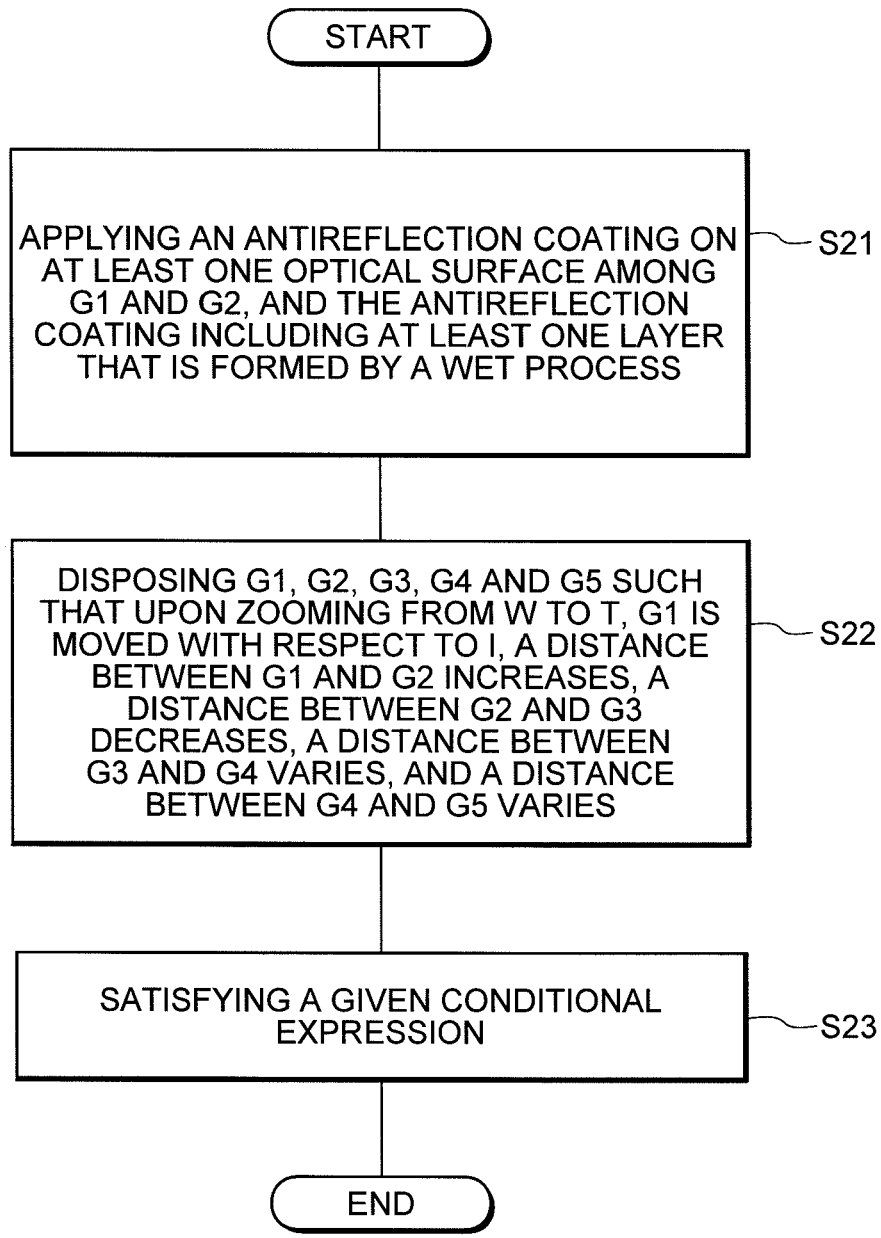
FIG. 14 is a flowchart schematically explaining a method for manufacturing a zoom lens system seen from another point of view according to the present invention.

FIG. 14 is a flowchart schematically explaining a method for manufacturing a zoom lens system seen from another point of view according to the present invention.

The method for manufacturing a zoom lens system ZL seen from another point of view according to the present invention is a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising the following steps S21 through S23:

Step S21: applying an antireflection coating on at least one optical surface among the first lens group and the second lens group, and the antireflection coating including at least one layer that is formed by a wet process;

Step S22: disposing the first lens group, the second lens group, the third lens group, the fourth lens group and the fifth lens group such that upon zooming from a wide-angle end state to a telephoto end state, the first lens group is moved with respect to the image plane, a distance between the first lens group and the second lens group increases, a distance between the second lens group and the third lens group decreases, a distance between the third lens group and the fourth lens group varies, and a distance between the fourth lens group and the fifth lens group varies; and Step S23: satisfying the following conditional expression (1):

$$6.500<f1/(-f2)<10.000 \qquad (1)$$

where f1 denotes a focal length of the first lens group, and f2 denotes a focal length of the second lens group.

With this method for manufacturing a zoom lens system seen form another point of view according to the present invention, it becomes possible to manufacture a zoom lens system having high optical performance with suppressing ghost images and flare.

What is claimed is:

1. A zoom lens system comprising, in order from an object side along an optical axis:
   a first lens group having positive refractive power;
   a second lens group having negative refractive power;
   a third lens group having positive refractive power;
   a fourth lens group having negative refractive power; and
   a fifth lens group having positive refractive power,
   upon zooming from a wide-angle end state to a telephoto end state, the first lens group being moved with respect to an image plane, a distance between the first lens group and the second lens group increasing, a distance between the second lens group and the third lens group decreasing, a distance between the third lens group and the fourth lens group varying, and a distance between the fourth lens group and the fifth lens group varying, and the following conditional expression being satisfied:

$$7.300<f1/(-f2)<10.000,$$
   $$5.200<f1/fw<11.000,$$
   $$0.280<f1/ft<0.480$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

2. The zoom lens system according to claim 1, wherein the following conditional expression is satisfied:

$$0.500<f3/(-f4)<1.300$$

where f3 denotes a focal length of the third lens group, and f4 denotes a focal length of the fourth lens group.

3. The zoom lens system according to claim 1, wherein the following conditional expression is satisfied:

$$0.0300<(-f2)/ft<0.0700$$

where ft denotes a focal length of the zoom lens system in the telephoto end state, and f2 denotes a focal length of the second lens group.

4. The zoom lens system according to claim 1, wherein the following conditional expression is satisfied:

$$0.050<f3/ft<0.150$$

where ft denotes a focal length of the zoom lens system in the telephoto end state, and f3 denotes a focal length of the third lens group.

5. The zoom lens system according to claim 1, wherein upon zooming from the wide-angle end state to the telephoto end state, the first lens group is moved to the object side with respect to the image plane.

6. The zoom lens system according to claim 1, wherein upon zooming from the wide-angle end state to the telephoto end state, the distance between the third lens group and the fourth lens group increases, and the distance between the fourth lens group and the fifth lens group decreases.

7. The zoom lens system according to claim 1, wherein upon zooming from the wide-angle end state to the telephoto end state, the third lens group and the fifth lens group are moved in a body with respect to the image plane.

8. The zoom lens system according to claim 1, wherein an aperture stop is disposed to the image side of the second lens group.

9. The zoom lens system according to claim 8, wherein the aperture stop is disposed between the second lens group and the third lens group.

10. The zoom lens system according to claim 9, wherein upon zooming from the wide-angle end state to the telephoto end state, the aperture stop is moved in a body with the third lens group.

11. An optical apparatus equipped with the zoom lens system according to claim 1.

12. The zoom lens system according to claim 1, wherein at least one optical surface of the optical surfaces in the first lens group and the second lens group is applied with an antireflection coating, and the antireflection coating includes at least one layer that is formed by a wet process.

13. The zoom lens system according to claim 12, wherein the antireflection coating is a multilayered film, and the layer formed by the wet process is the outermost layer among the layers composing the multilayered film.

14. The zoom lens system according to claim 12, wherein a refractive index at d-line of the layer formed by the wet process is 1.30 or less.

15. The zoom lens system according to claim 12, wherein the zoom lens system includes an aperture stop, and an optical surface of the optical surfaces in the first lens group and the second lens group on which the antireflection coating is applied is a concave lens surface seen from the image side of the aperture stop along the optical axis.

16. The zoom lens system according to claim 15, wherein the concave lens surface seen from the image side of the aperture stop along the optical axis on which the antireflection coating is applied is an image side lens surface of the optical surfaces in the first lens group and the second lens group.

17. The zoom lens system according to claim 15, wherein the concave lens surface seen from the image side of the aperture stop along the optical axis on which the antireflection coating is applied is an object side lens surface of the optical surfaces in the first lens group and the second lens group.

18. The zoom lens system according to claim 12, wherein an optical surface on which the antireflection coating is applied is a concave lens surface seen from the object.

19. The zoom lens system according to claim 18, wherein, the concave surface on which the antireflection coating is applied is an image side lens surface of the image side second lens from the most object side lens in the first lens group.

20. The zoom lens system according to claim 18, wherein, the concave surface on which the antireflection coating is applied is an object side lens surface of the image side second lens from the most object side lens in the second lens group.

21. The zoom lens system according to claim 18, wherein, the concave surface on which the antireflection coating is applied is an image side lens surface of the image side third lens from the most object side lens in the second lens group.

22. The zoom lens system according to claim 18, wherein, the concave surface on which the antireflection coating is applied is an object side lens surface of the image side fourth lens from the most object side lens in the second lens group.

23. A method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, the method comprising steps of:

disposing the first lens group, the second lens group, the third lens group, the fourth lens group and the fifth lens group such that upon zooming from a wide-angle end state to a telephoto end state, the first lens group is moved with respect to the image plane, a distance between the first lens group and the second lens group increases, a distance between the second lens group and the third lens group decreases, a distance between the third lens group and the fourth lens group varies, and a distance between the fourth lens group and the fifth lens group varies; and satisfying the following conditional expression:

$$7.300 < f1/(-f2) < 10.000,$$

$$5.200 < f1/fw < 11.000,$$

$$0.280 < f1/ft < 0.480$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

24. The method according to claim 23, further comprising a step of:

applying an antireflection coating on at least one optical surface of the optical surfaces in the first lens group and the second lens group, and the antireflection coating including at least one layer that is formed by a wet process.

* * * * *